US012633245B2

(12) United States Patent
Kwon et al.

(10) Patent No.: US 12,633,245 B2
(45) Date of Patent: May 19, 2026

(54) SOURCE DRIVER AND DISPLAY DRIVING CIRCUIT INCLUDING THE SAME

(71) Applicant: SAMSUNG ELECTRONICS CO., LTD., Suwon-si (KR)

(72) Inventors: Taek Su Kwon, Suwon-si (KR); In-Suk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/054,293

(22) Filed: Feb. 14, 2025

(65) Prior Publication Data

US 2026/0018102 A1 Jan. 15, 2026

(30) Foreign Application Priority Data

Jul. 12, 2024 (KR) ........................ 10-2024-0092329

(51) Int. Cl.
*G09G 3/20* (2006.01)

(52) U.S. Cl.
CPC ..... *G09G 3/2092* (2013.01); *G09G 2310/027* (2013.01); *G09G 2310/0291* (2013.01); *G09G 2320/0276* (2013.01)

(58) Field of Classification Search
CPC ........... G09G 3/2092; G09G 2310/027; G09G 2310/0291; G09G 2320/0276
USPC .......................................................... 345/690
See application file for complete search history.

(56) References Cited

U.S. PATENT DOCUMENTS

| | | | | |
|---|---|---|---|---|
| 2010/0020114 | A1 | 1/2010 | Lee et al. | |
| 2018/0082654 | A1 | 3/2018 | Song et al. | |
| 2018/0122291 | A1 | 5/2018 | Kim et al. | |
| 2019/0304395 | A1* | 10/2019 | Kim | G09G 3/3291 |
| 2021/0012743 | A1 | 1/2021 | Lee et al. | |
| 2021/0056907 | A1 | 2/2021 | Hatanaka et al. | |
| 2021/0295782 | A1* | 9/2021 | Bae | G09G 3/3688 |
| 2024/0112647 | A1 | 4/2024 | Ishii | |

FOREIGN PATENT DOCUMENTS

| | | | | | |
|---|---|---|---|---|---|
| KR | 10-2011-0024152 | A | | 3/2011 | |
| KR | 20240051682 | A | * | 4/2024 | G09G 3/3208 |

OTHER PUBLICATIONS

English translation of KR20240051682A (Year: 2024).*

* cited by examiner

*Primary Examiner* — Nathan P Brittingham
(74) *Attorney, Agent, or Firm* — MORGAN, LEWIS & BOCKIUS LLP

(57) ABSTRACT

A display driving circuit may include a source driver that includes a decoder circuit and a buffer circuit. The decoder circuit selects a first gamma voltage and a second gamma voltage among a plurality of gamma voltages based on pixel data, and selects a third gamma voltage different from the first and second gamma voltages among the plurality of gamma voltages. The buffer circuit interpolates between the first and second gamma voltages to output a first target voltage, and steps up or steps down a source voltage formed on the source line to the first target voltage. The buffer circuit includes a fast slew circuit that compares the first source voltage with the third gamma voltage to adjust slew rate of the first source voltage.

20 Claims, 19 Drawing Sheets

FIG. 6

| GAMMA VOLTAGE | IPL | VH SELECTION | VL SELECTION | FS CIRCUIT INPUT | | SLEW RATE | | |
|---|---|---|---|---|---|---|---|---|
| | | | | STEP-UP | STEP-DOWN | STEP-UP | STEP-DOWN | |
| VH : VGk<br>VL : VG(k+1) | ... | ... | ... | ... | ... | ... | ... | |
| | 1111 | - | 16 | VL<br>(VG(k+1)) | VH<br>(VGK) | SLOW | FAST | ←CASE1 |
| VH : VG(k+1)<br>VL : VG(k+2) | 0000 | 15 | 1 | VL<br>(VG(k+2)) | VH<br>(VG(k+1)) | FAST | SLOW | ←CASE2 |
| | ... | ... | ... | ... | ... | ... | ... | |
| | 1111 | - | 16 | VL<br>(VG(k+2)) | VH<br>(VG(k+1)) | SLOW | FAST | |
| VH : VG(k+2)<br>VL : VG(k+3) | 0000 | 15 | 1 | VL<br>(VG(k+3)) | VH<br>(VG(k+2)) | FAST | SLOW | |
| | ... | ... | ... | ... | ... | ... | ... | |

FIG. 12

| GAMMA VOLTAGE | IPL | VH SELECTION | VL SELECTION | FS CIRCUIT INPUT | SLEW RATE | | |
|---|---|---|---|---|---|---|---|
| | | | | | STEP-UP | STEP-DOWN | |
| VH : VGk<br>VL : VG(k+1) | ... | ... | ... | ... | ... | ... | |
| | 1111 | - | 16 | VG(k+2) | FAST | FAST | ←CASE3 |
| VH : VG(k+1)<br>VL : VG(k+2) | 0000 | 15 | 1 | VG(k+3) | FAST | FAST | ←CASE4 |
| | ... | ... | ... | ... | ... | ... | |
| | 1111 | - | 16 | VG(k+3) | FAST | FAST | |
| VH : VG(k+2)<br>VL : VG(k+3) | 0000 | 15 | 1 | VG(k+4) | FAST | FAST | |
| | ... | ... | ... | ... | ... | ... | |

FIG. 15

| GAMMA VOLTAGE | IPL | VH SELECTION | VL SELECTION | FS CIRCUIT INPUT | | SLEW RATE | | |
|---|---|---|---|---|---|---|---|---|
| | | | | STEP-UP | STEP-DOWN | STEP-UP | STEP-DOWN | |
| VH : VGk<br>VL : VG(k+1) | ... | ... | ... | ... | ... | ... | ... | |
| | 1111 | - | 16 | VG(k-1) | VG(k+2) | FAST | FAST | ←CASE5 |
| VH : VG(k+1)<br>VL : VG(k+2) | 0000 | 15 | 1 | VGk | VG(k+3) | FAST | FAST | ←CASE6 |
| | ... | ... | ... | ... | ... | ... | ... | |
| | 1111 | - | 16 | VGk | VG(k+3) | FAST | FAST | |
| VH : VG(k+2)<br>VL : VG(k+3) | 0000 | 15 | 1 | VG(k+1) | VG(k+4) | FAST | FAST | |
| | ... | ... | ... | ... | ... | ... | ... | |

600

SOURCE DRIVER AND DISPLAY DRIVING CIRCUIT INCLUDING THE SAME

CROSS-REFERENCE TO RELATED APPLICATION

This application claims priority from Korean Patent Application No. 10-2024-0092329 filed on Jul. 12, 2024, in the Korean Intellectual Property Office, and all the benefits accruing therefrom under 35 U.S.C. 119, the contents of which in its entirety are herein incorporated by reference.

TECHNICAL FIELD

This disclosure relates generally to a source driver and a display driving circuit including the same; and more particularly, to slew rate control in a display device.

DISCUSSION OF RELATED ART

Display devices used in today's electronic devices such as a television, a laptop, a monitor, and a mobile terminal include a liquid crystal display (LCD), an organic light emitting display (OLED), and the like. The display device may include a display panel having a plurality of pixels, and a gate driver and a source driver for applying electrical signals to the pixels. An image may be generated by the electrical signals applied by the gate driver and the source driver to the pixels. In recent years, research for improving performance of the display device, such as a resolution and a refresh rate has been conducted.

The source driver may receive a plurality of gamma voltages for correcting grayscale voltages applied to the pixels (for controlling pixel brightness), and generate a respective gradation voltage (i.e., a grayscale voltage) with gamma correction, corresponding to each of the pixels. To minimize an increase in chip size (e.g., for using a large look-up table of gamma voltages associated with pixel data), the source driver may receive a plurality of gamma voltages and interpolate between them to generate various gradation voltages with gamma correction.

SUMMARY

Aspects of the present inventive concept provide a source driver which has improved reliability and high-speed driving capability.

Aspects of the present inventive concept provide a display driving circuit which has improved reliability and high-speed driving capability.

According to an aspect of present disclosure, there is provided a source driver includes: a decoder circuit which receives first pixel data and a plurality of gamma voltages, selects a first gamma voltage and a second gamma voltage among the plurality of gamma voltages based on the first pixel data, and selects a third gamma voltage different from the first and second gamma voltages from the plurality of gamma voltages, the second gamma voltage being smaller than the first gamma voltage; and a buffer circuit which receives second pixel data and the first to third gamma voltages, and steps up or steps down a source voltage of a source line to a target voltage on the basis of the first and second pixel data, using the first to third gamma voltages. The buffer circuit includes an interpolation circuit that interpolates between the first and second gamma voltages on the basis of the second pixel data to provide the target voltage on the source line, and a fast-slew circuit that compares the source voltage with the third gamma voltage to adjust slew rate of the source voltage.

According to an aspect of present disclosure, there is provided a source driver comprises a first buffer which is connected to a first source line, and includes a first interpolation circuit which receives a first pixel data, a first gamma voltage, and a second gamma voltage smaller than the first gamma voltage, interpolates the first and second gamma voltages to select a first target voltage corresponding to the first pixel data, and steps down a first source voltage of the first source line to a first target voltage, and a first fast-slew circuit which receives a third gamma voltage smaller than the second gamma voltage, and compares the first source voltage with the third gamma voltage to adjust slew rate of the first source voltage, a second buffer which is connected to the second source line, and includes a second interpolation circuit which receives a second pixel data, a fourth gamma voltage, and a fifth gamma voltage smaller than the fourth gamma voltage, interpolates the fourth and fifth gamma voltages to select a second target voltage corresponding to the second pixel data, and steps up the second source voltage of the second source line to a second target voltage, and a second fast-slew circuit which receives a sixth gamma voltage greater than the fourth gamma voltage, and compares the second source voltage with the sixth gamma voltage to adjust slew rate of the second source voltage, and a decoder circuit which receives a plurality of gamma voltages, selects the first through sixth gamma voltages among the plurality of gamma voltages, and provides them to the first and second buffers.

According to an aspect of present disclosure, there is provided a display driving circuit comprises a source driver which applies a first target voltage to a first source line connected to a first pixel on the basis of pixel data, a gamma voltage generator which provides a plurality of gamma voltages to the source driver, and a timing controller which controls the source driver and the gamma voltage generator, and provides the pixel data to the source driver, wherein the source driver includes: a decoder circuit that selects a first gamma voltage and a second gamma voltage among the plurality of gamma voltages based on the basis of the pixel data, and selects a third gamma voltage different from the first and second gamma voltages among the plurality of gamma voltages, and a first buffer that interpolates between the first and second gamma voltages to select the first target voltage, steps up or steps down a first source voltage formed on the first source line to the first target voltage, and compares the first source voltage with the third gamma voltage to adjust slew rate of the first source voltage.

However, aspects of the present inventive concept are not restricted to the ones set forth herein. The above and other aspects of the present inventive concept will become more apparent to one of ordinary skill in the art to which the present inventive concept pertains by referencing the detailed description of embodiments of the present inventive concept given below.

BRIEF DESCRIPTION OF DRAWINGS

FIG. 6 is a table showing the slew rate of the output voltage according to the input of a comparison transistor pair.

FIG. 12 is a table showing the slew rate of the output voltage according to the input of a comparison transistor pair.

FIG. 15 is a diagram showing the slew rate of the output voltage according to the input of a comparison transistor pair.

DETAILED DESCRIPTION OF EMBODIMENTS

Hereinafter, embodiments according to the technical idea of the present inventive concept will be described referring to the attached drawings.

In some embodiments of the inventive concept as described below, a fast slew circuit (e.g., 126_2, FIG. 9) uses a third gamma voltage (e.g., VG(k+2), FIG. 12) to supply current to speed up frame to frame voltage transitions on a source line of a display device. This differs from circuits which use a first or second gamma voltage (e.g., VGk, VG(k+1) to supply the current, where the first or second gamma voltages are already used by an interpolation circuit (e.g., 125_1, FIG. 4) and may be loaded down. By using the third gamma voltage, slew adjustment performance (e.g., faster settling time) is realized.

Figure 13:
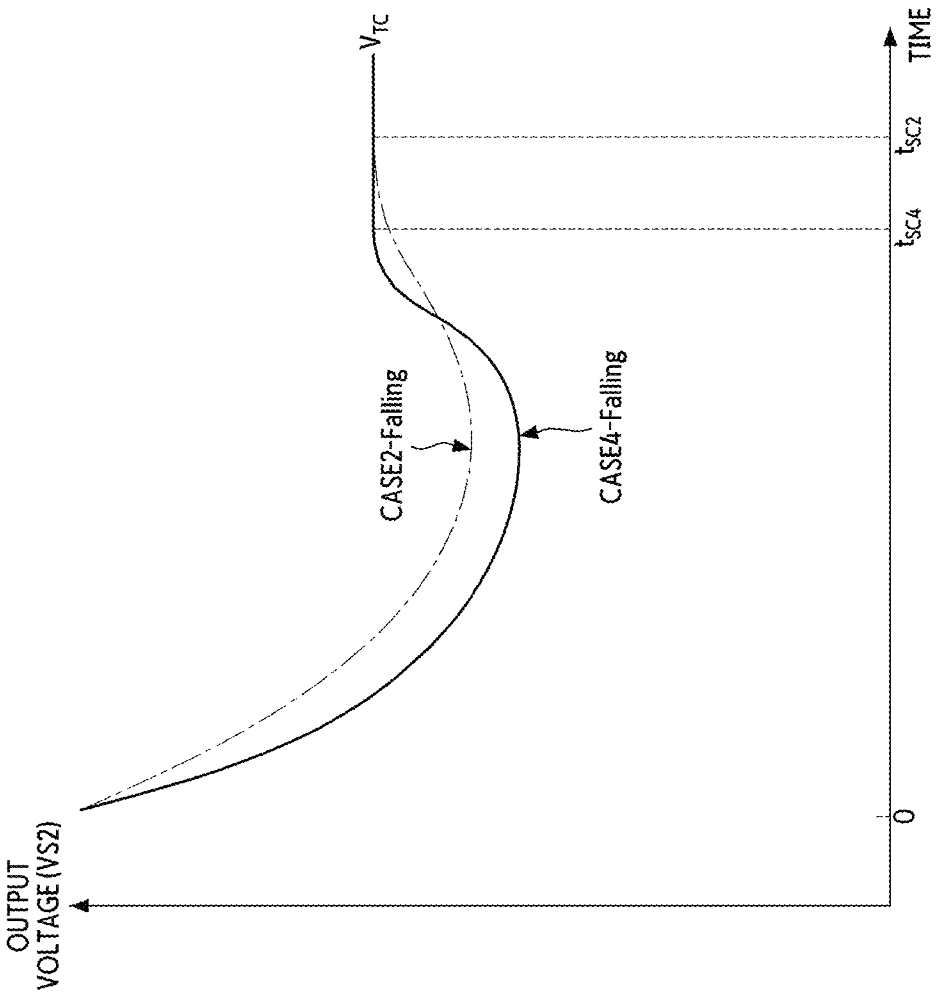
FIG. 13 is a graph showing the slew curve of the output voltage that decreases according to the selected gradation voltage.
Figure 14:
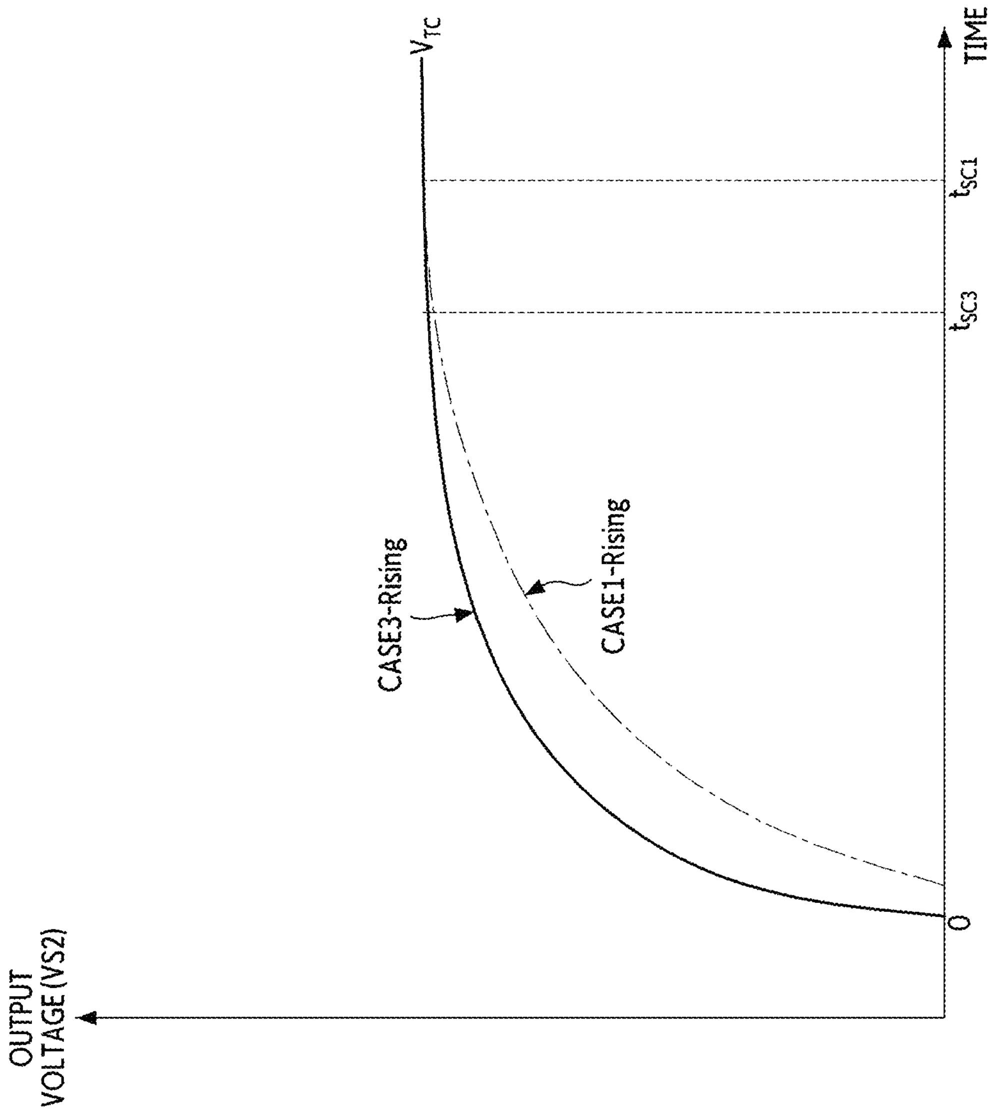
FIG. 14 is a graph showing the slew curve of the output voltage that increases according to the selected gradation voltage.

For example, a decoder circuit (e.g., 123_2, FIGS. 3 and 9) may receive most significant bits (MSB, e.g., 6-bit data) of pixel data (PD, e.g., 10-bit data) from a data latch (122, FIG. 3) and a plurality of gamma voltages (VG). The decoder circuit may select a first gamma voltage (VGk=VH) and a second gamma voltage (VG(k+1)=VL) among the gamma voltages based on the pixel data. This may establish a coarse range for a target gradation voltage (e.g., $V_{TC}$ (FIGS. 13 and 14)) to be applied during a current frame to a pixel connected to a source line (SL2, FIG. 9). The target gradation voltage may be a voltage between VH and VL. A buffer circuit (UB2, FIGS. 3 and 9) may receive second pixel data (IPL) which may be least significant bits (LSB) of the pixel data, e.g., 4-bit data out of the 10-bit first pixel data. The LSB bits may define the location of the target voltage (a sub-range) between VH and VL. The buffer circuit may include an interpolation circuit (e.g., 125_2, FIG. 9) that interpolates between VH and VL to output the target voltage $V_{TC}$ on the basis of the second pixel data. However, to speed up the transition (e.g., reduce settling time) from a previous frame's source line voltage VS2, a fast-slew circuit (e.g., 126_2) is used to compare the source voltage VS2 with the third gamma voltage and adjust the source voltage to reach the target voltage in a reduced timeframe. Slew rate adjusting performance (e.g., faster settling time and reduced voltage "inversion" during the transition period) is improved (e.g., as shown in FIGS. 13 and 14) as compared to related art circuits by using the third gamma voltage to supply current for the purpose of speeding up the transition, instead of using VH or VL, which may be loaded down by the interpolation circuit for the interpolation.

Figure 1:
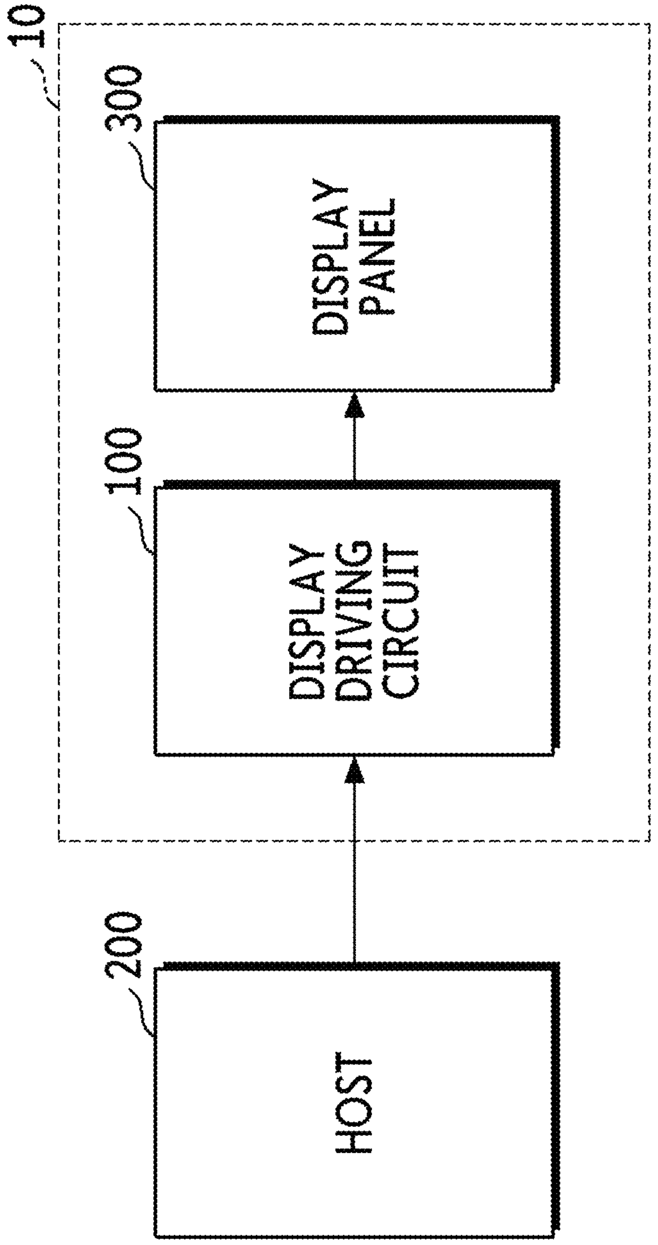
FIG. 1 is a block diagram showing a display system including a display device.

FIG. 1 is a block diagram showing a display system including a display device.

Referring to FIG. 1, a display system 1 includes a display device 10 and a host 200, and the display device 10 may include a display driving circuit 100 and a display panel 300.

The host 200 may generate image data to be displayed on the display panel 300, and provide image data and control commands to the display driving circuit 100. For example, the control command may include setting information about a brightness, a gamma, a frame frequency, an operating mode of the display driving circuit 100, and the like. The host 200 may provide a clock signal, a synchronization signal, or the like to the display driving circuit 100.

The host 200 may be a GPU (Graphics Processing Unit). However, the host 200 may be implemented by various types of processors, such as a CPU (Central Processing Unit), a microprocessor, a multimedia processor, and an application processor without being limited thereto. The host 200 may also be implemented by an integrated circuit (IC) or a SoC (System on Chip).

The display device 10 may display an image corresponding to image data provided by the host 200. The display device 10 may be a device in which the display driving circuit 100 and the display panel 300 are implemented as a single module. For example, the display driving circuit 100 is mounted on a substrate of the display panel 300, or the display driving circuit 100 and the display panel 300 may be electrically connected through a connecting member such as a flexible printed circuit board (FPCB).

The display panel 300 is a display unit on which an actual image is displayed, and may be one of display devices that receive an electrically transferred image signal and display a two-dimensional image, such as an organic light emitting diode (OLED) display, a thin film transistor-liquid crystal display (TFT LCD), a field emission display, and a plasma display panel (PLSM). The display driving circuit 100 may convert image data received from the host 200 into a plurality of analog signals for driving the display panel 300, for example, a plurality of source voltages, and supply the converted analog signals to the display panel 300. As a result, an image corresponding to the image data may be displayed on the display panel 300.

Figure 2:
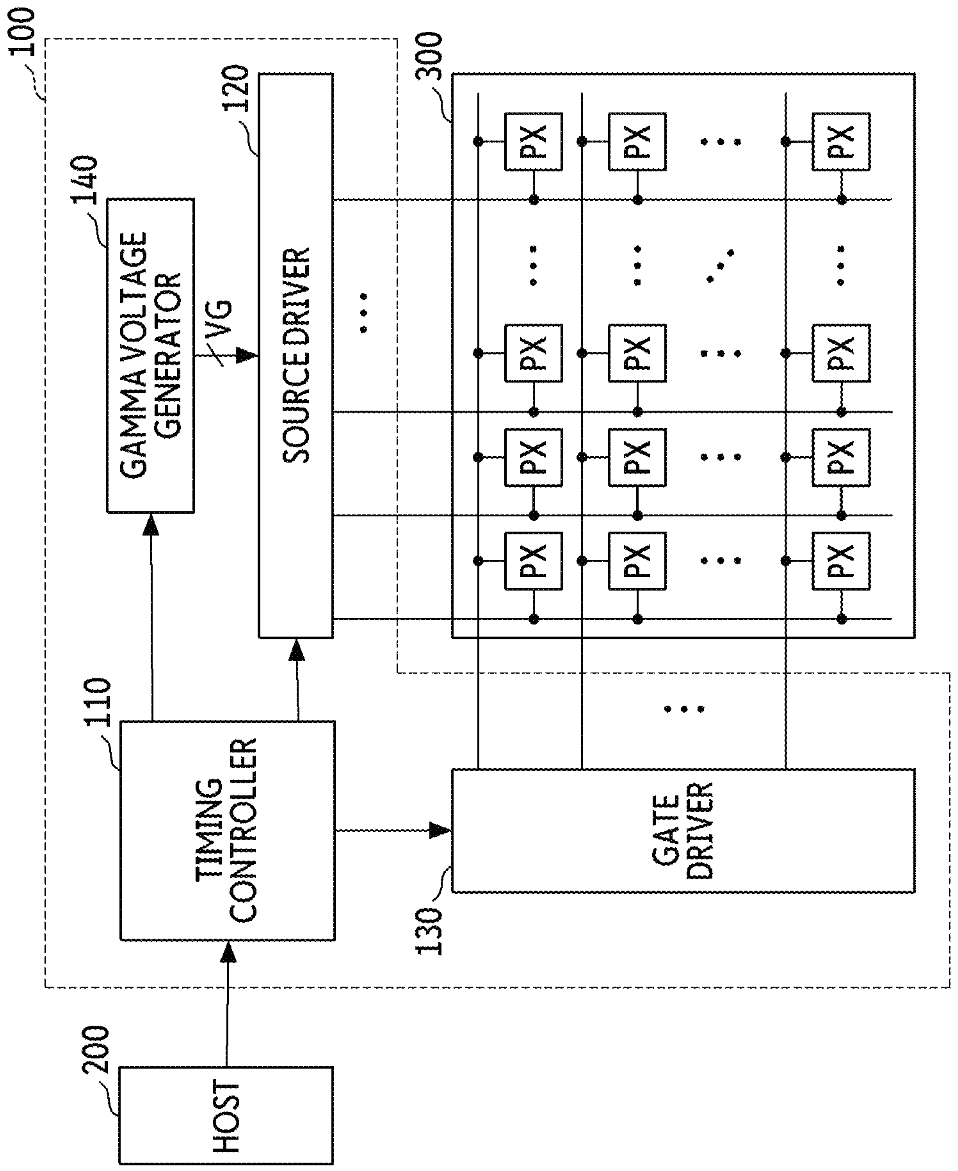
FIG. 2 is a block diagram showing a display device including the display driving circuit.

FIG. 2 is a block diagram showing a display device including the display driving circuit.

Referring to FIG. 2, the display driving circuit 100 may include a source driver 120, a gate driver 130, a gamma voltage generator 140, and a timing controller 110.

A plurality of source lines and a plurality of gate lines intersect each other in the display panel 300, and pixels PX may be disposed in a matrix form at each intersection region. The display panel 300 may be, but not limited to, a flat panel display panel such as a TFT-LCD, a PDP, an LED display or an OLED.

Each pixel PX may be connected to any one of the source lines, and any one of the gate lines. Each pixel PX is electrically connected to the source line in response to a gate pulse that is input through the gate line, and may receive input of a source voltage from the source line. The display operation of the display panel 300 may be made up of one operation of the source driver 120 and the gate driver 130 according to the control of the timing controller 110.

The source driver 120 may convert the pixel data PD, which is a digital signal, into a source voltage for image display in accordance with a data timing control signal applied from the timing controller 110 at the time of a display operation, and provide the converted voltage to the source lines.

The gate driver 130 may generate a gate pulse for image display on the basis of the gate control signal at the time of the display operation, and then sequentially supply the gate pulse to the gate lines in a row-sequential manner.

The timing controller 110 generates a data control signal for controlling the operation timing of the source driver 120 and a gate control signal for controlling the operation timing of the gate driver 130 on the basis of timing signals such as a vertical synchronization signal, a horizontal synchronization signal, a dot clock signal, and a data enable signal.

The display device 10 may display an image in units of frames. The time required to display one frame may be defined as a vertical period, and the vertical period may be determined by a refresh rate of the display device 10. For example, when the refresh rate of the display device 10 is 60 Hz, the vertical period may be 1/60 seconds, about 16.7 msec, and when the refresh rate of the display device 10 is 120 Hz, the vertical period may be 1/120 seconds, about 8.3 msec.

During one vertical period, the gate driver 130 may scan each of the plurality of gate lines. The time at which the gate driver 130 scans each of the gate lines may be defined as a horizontal period, and the source driver 120 may input a gradation voltage to the pixels PX during one horizontal period. The gradation voltage may be a voltage that is output by the source driver 120 on the basis of the pixel data PD, and the brightness of each pixel PX may be determined by the gradation voltage.

The gamma voltage generator 140 may generate a plurality of gamma voltages VG according to the control of the timing controller 110. The generated gamma voltages VG may be provided to the source driver 120 through a plurality of gamma lines. For example, the gamma voltage generator 140 may receive information on the gamma characteristics of the display device 10 from the timing controller 110, and generate the gamma voltages VG suitable for a gamma curve according to the gamma characteristics.

Figure 3:
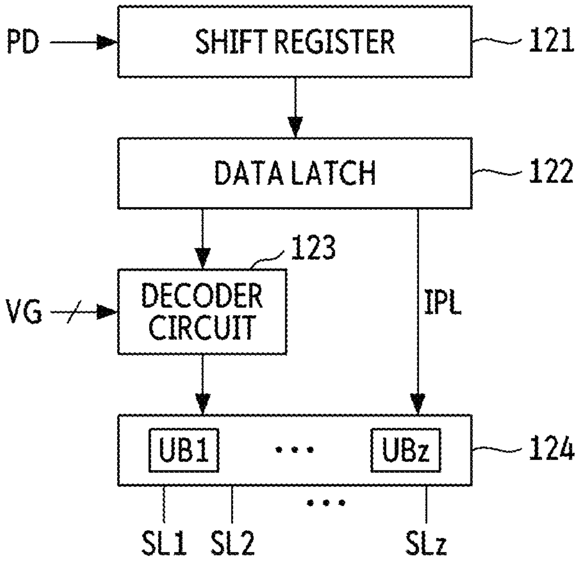
FIG. 3 is a block diagram showing the structure of the source driver of FIG. 2.

FIG. 3 is a block diagram showing the structure of the source driver of FIG. 2.

Referring to FIG. 3, the source driver 120 may include a shift register 121, a data latch 122, a decoder circuit 123, and a buffer circuit ("buffer") 124. The buffer circuit 124 may include a plurality of unit buffers UB1 to UBz including a first buffer UB1.

The shift register 121 may receive pixel data PD, and control the operation timings of each of a plurality of sampling circuits included in the data latch 122 in response to a timing control signal. The timing control signal may be a signal having a predetermined period.

The data latch 122 may sample and store the pixel data PD in accordance with the shift order of the shift register 121. The data latch 122 may output a portion of the sampled pixel data PD to the decoder circuit 123, and output the remaining portion to the buffer circuit 124.

The decoder circuit 123 may be a digital-analog converter. The decoder circuit 123 may receive pixel data PD from the data latch (122 of FIG. 3), and may receive input of the plurality of gamma voltages VG from the gamma voltage generator (140 of FIG. 2) through the plurality of gamma lines. The number of the plurality of gamma voltages VG may be determined depending on the number of bits of the pixel data PD received by the decoder circuit 123. For example, when the pixel data PD received by the decoder circuit 123 is 8-bit data, the number of the plurality of gamma voltages VG may be 256 or less. As another example, when the pixel data PD is 10-bit data, the number of the plurality of gamma voltages VG may be 1024 or less.

The buffer circuit 124 may include the plurality of unit buffers UB1 to UBz implemented by operational amplifiers, and each of the unit buffers UB1 to UBz may be connected to the plurality of source lines SL1 to SLz. Each of the plurality of unit buffers UB1 to UBz may have a plurality of input terminals. The decoder circuit 123 may select at least some among the plurality of gamma voltages VG on the basis of the received pixel data PD, and provide them as input voltages VL and VH to the input terminals of each of the plurality of unit buffers UB1 to UBz.

Each of the plurality of unit buffers UB1 to UBz may interpolate the input voltages VL and VH provided from the decoder circuit 123, and output them to the source lines SL1 to SLz as gradation voltages. At this time, each of the unit buffers UB1 to UBz may by interpolate the input voltages VL and VH provided from the decoder circuit 123 to generate various gradation voltages between the input voltages VL and VH. Therefore, for example, when the pixel data PD is 10-bit data, even if the number of gamma lines for inputting the gamma voltages VG to the decoder circuit 123 is smaller than 1024, each of the unit buffers UB1 to UBz may output one of the 1024 gradation voltages. When the unit buffers UB1 to UBz are implemented by the above-mentioned interpolation method, the chip size of the display driving circuit 100 may be reduced by removing some of the gamma lines.

Each of the components 121, 122, 123, and 124 included in the source driver 120 is not limited to that shown in FIG. 3, and may be modified in various ways.

Figure 4:
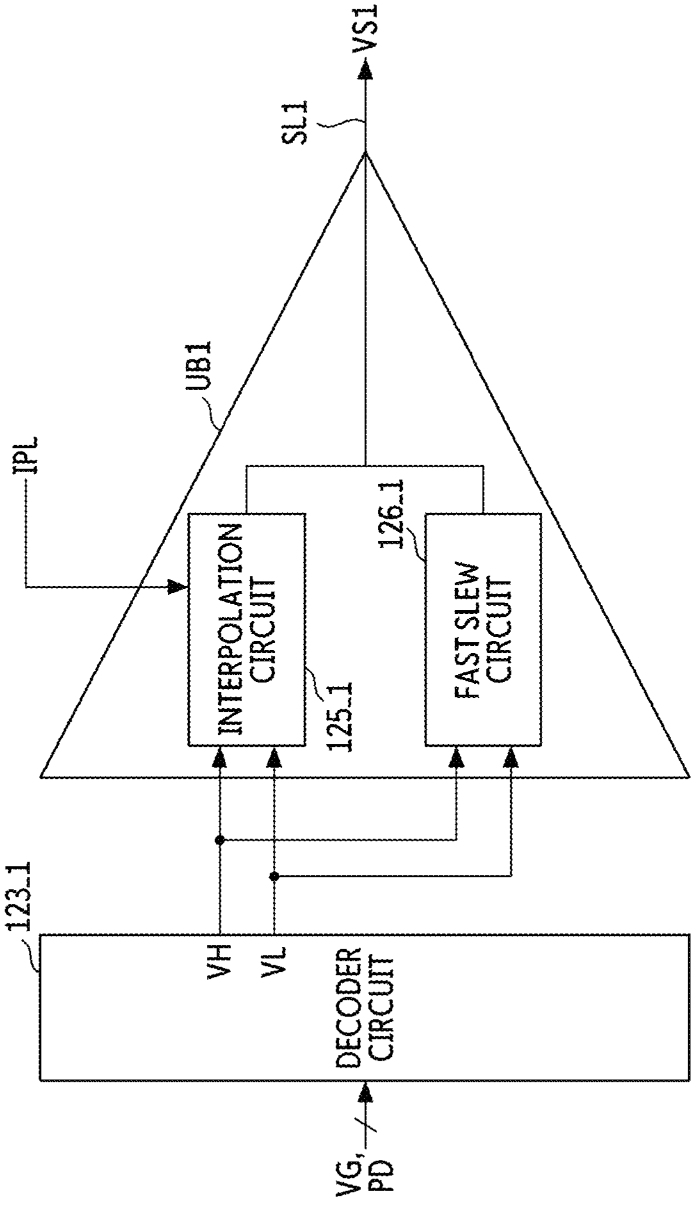
FIG. 4 is a block diagram showing a decoder circuit and one unit buffer of the unit buffers.

FIG. 4 is a block diagram showing a decoder circuit and one unit buffer of the unit buffers.

Hereinafter, it is assumed that the pixel data PD received by the source driver (120 of FIG. 2) is 10-bit data, and the number of gamma voltages VG received by a decoder circuit 123_1 is 64. Referring to FIG. 4, the decoder circuit 123_1 may receive 6-bit pixel data PD, which may be a part of the 10-bit pixel data PD. In addition, the decoder circuit 123_1 may receive 64 gamma voltages VG. The 64 gamma voltages VG each have different voltage magnitudes, and may have a certain voltage difference from the lowest gamma voltage (VG63) to the highest gamma voltage (VG0). For example, a certain gamma voltage (VGk) and an adjacent gamma voltage (VG(k+1)) smaller than it may have a voltage difference by a unit voltage (e.g., about 0.1 V). The decoder circuit 123_1 may select two gamma voltages VH and VL (a "VH-VL pair") among the plurality of gamma voltages VG on the basis of the received pixel data PD. In this regard, the second gamma voltage VL may have a voltage that is adjacent to the first gamma voltage VH in a sequence of the 64 gamma voltages, and is lower than the first gamma voltage VH by the unit voltage.

The decoder circuit 123_1 may provide the selected two gamma voltages VH and VL to the first buffer UB1. The first buffer UB1 may include an interpolation circuit 125_1 and a fast-slew circuit 126_1. The interpolation circuit 125_1 may receive the two gamma voltages VH and VL from the decoder circuit 123_1, and may also receive 4-bit "interpolated data" IPL, which may be the remaining bits, i.e., the least significant bits (LSB) of the pixel data PD, from the data latch 122. Depending on the total number of bits of the pixel data and the number of received gamma voltages VG, the interpolated data IPL may have various numbers of bits as an alternative to 4 bits. The interpretated data IPL associated with any VH-VL pair may be considered data for representing a voltage interpolated between the VH-VL pair, which may be understood as follows: for 4-bit LSB, there may be 16 ranges of sub-voltages between the VH-VL pair, represented by codes 0000 to 1111. When the 4-bit LSB data of the pixel data PD associated with the VH-VL pair represents a voltage in the upper-most range (closest to VH), it may have the code 0000 (or alternatively, the code 1111). When the 4-bit LSB represents a voltage in the lower-most range (closest to VL) it may have the code 1111 (or alternatively, the code 0000). When the 4-bit LSB represents a voltage between the lower-most range and the upper-most range, it may have a code between (and inclusive of) 0001 and 1110.

The interpolation circuit 125_1 may interpolate between two gamma voltages VH and VL (a VH-VL pair) to select and output a gradation voltage $V_{TC}$ corresponding to the received interpolated data IPL. For example, the interpolation circuit 125_1 may select a first gamma voltage VH x times in a temporal sequence to perform voltage integration (x is an integer of $0 \leq x < 2^4$), and to similarly select the second gamma voltage VL ($2^4$-x) times in a temporal sequence to arrive at a selected gradation voltage corresponding to the received interpolated data IPL. More specifically, for example, when the interpolated data IPL is "0000", the first gamma voltage VH may be selected 15 times and the second gamma voltage VL may be selected once to select the gradation voltage corresponding to "0000", and when the interpolated data IPL is "1111", the first gamma voltage VH may be selected 0 times and the second gamma voltage VL may be selected 16 times to select the gradation voltage corresponding to "1111". The method for selecting the gradation voltage is not limited to the above example, and the gradation voltages may be selected from two gamma voltages VH and VL through various other methods.

Now, as the interpolation circuit 125_1 selects the first gamma voltage VH or the second gamma voltage VL multiple times, a considerable load may be applied to the gamma line that supplies the first gamma voltage VH and the gamma line that supplies the second gamma voltage VL. As certain gamma voltages are selected more, the load applied to the gamma line that supplies the relevant gamma voltage may be greater. For example, when the interpolated data IPL is "1111", the first gamma voltage VH is selected 0 times and the second gamma voltage VL is selected 16 times, and the gamma line that supplies the second gamma voltage VL may be subject to a heavier load than the gamma line that supplies the first gamma voltage VH, accordingly.

The interpolation circuit 125_1 may step up or step down the output voltage VS1 (of the previous frame) of the source line, which is connected to the first buffer UB1, to the selected gradation voltage. When the output voltage VS1 of the first source line SL1 is lower than the selected gradation voltage, the interpolation circuit 125_1 may step up the output voltage VS1 (of the previous frame) to the selected gradation voltage. When the output voltage VS1 is higher than the selected gradation voltage, the interpolation circuit 125_1 may step-down the output voltage VS1 to the selected gradation voltage.

Now, the time until the output voltage VS1 changes to the selected gradation voltage is defined as a settling time. In response to the demand for a display device having a high refresh rate, high-speed driving of the display is required. In order to drive the display at high speed, it is necessary to shorten the settling time. The fast-slew circuit 126_1 may shorten the settling time, by supplying current in a manner to increase a slew rate (the maximum change in voltage per unit time) of the output voltage VS1 until it becomes the selected gradation voltage $V_{TC}$.

Figure 5:
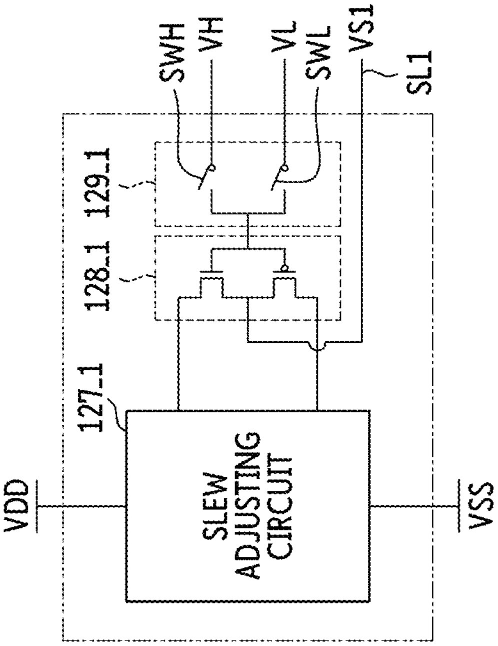
FIG. 5 is a block diagram showing a fast-slew circuit of FIG. 4.

FIG. 5 is a block diagram showing a fast-slew circuit of FIG. 4.

Referring to FIGS. 4 and 5, the fast-slew circuit 126_1 may include a slew rate ("slew") adjusting circuit 127_1, a comparison transistor pair 128_1, and a "slew input switch" 129_1.

The slew input switch 129_1 may receive two gamma voltages VH and VL (a VH-VL pair) received from the decoder circuit 123_1 as inputs, select one of the two received gamma voltages VH and VL by controlling switches SWH and SWL, and input the selected gamma voltage to the comparison transistor pair 128_1. Although the slew input switch 129_1 is shown as being included in the fast-slew circuit 126_1, in other designs the slew input switch 129_1 may be included in the decoder circuit 123_1. (Note that the slew input switch 129_1 may also be included in embodiments of the present inventive concept, discussed later.)

The comparison transistor 128_1 pair may have a structure in which an N-channel transistor (e.g., NMOS, no circle at gate) and a P-channel transistor (e.g., PMOS, circle shown at its gate) have their gates connected together. An output terminal of the comparison transistor pair 128_1 may be connected to an output terminal of the interpolation circuit 125_1 (outputting VS1), and may be connected to the first source line SL1 connected to the first buffer UB1. The comparison transistor pair 128_1 may receive the selected gamma voltage VH or VL received from the slew input switch 129_1 as an input, and compare it with the output voltage VS1 (of the previous frame) to adjust the output voltage VS1. For example, depending on a magnitude difference between the input voltage VH or VL and the output voltage VS1 of the comparison transistor pair 128_1, a current may be supplied from the slew adjusting circuit 127_1 in a direction to cause the difference between the selected input voltage VH or VL and the output voltage VS1 to decrease. This forces VS1 towards equaling the target gradation voltage (between VH and VL) faster. When the magnitude difference between the input voltage and the output voltage VS1 becomes smaller than the threshold voltage VTH of the N-channel transistor and the P-channel transistor over time, the comparison transistor pair 128_1 is turned off (no current flows between the source-drain of either transistor), and the current supply of the slew adjusting circuit 127_1 may also be stopped. By applying the current supply of the slew adjusting circuit 127_1, the output voltage VS1 may be rapidly changed to the gradation voltage selected by the interpolation circuit 125_1. The higher the slew rate adjusting performance of the fast-slew circuit 126_1, the faster may be the change of the output voltage VS1 of the first source line SL1 connected to the first buffer UB1 to the selected gradation voltage.

Now, the slew rate adjusting performance of the fast-slew circuit 126_1 may differ depending on the input voltage VH or VL of the comparison transistor pair 128_1. For example, when the fast-slew circuit 126_1 receives a gamma voltage from a gamma line of a heavy load, the slew rate adjusting performance may be lower than when the fast-slew circuit 126_1 receives the gamma voltage from the gamma line of a light load. That is to say, when the fast-slew circuit 126_1 receives the gamma voltage from the gamma line of the heavy load, it may take a longer time to change to the selected gradation voltage than when the fast-slew circuit 126_1 receives the gamma voltage from the gamma line of the light load.

Figure 7:
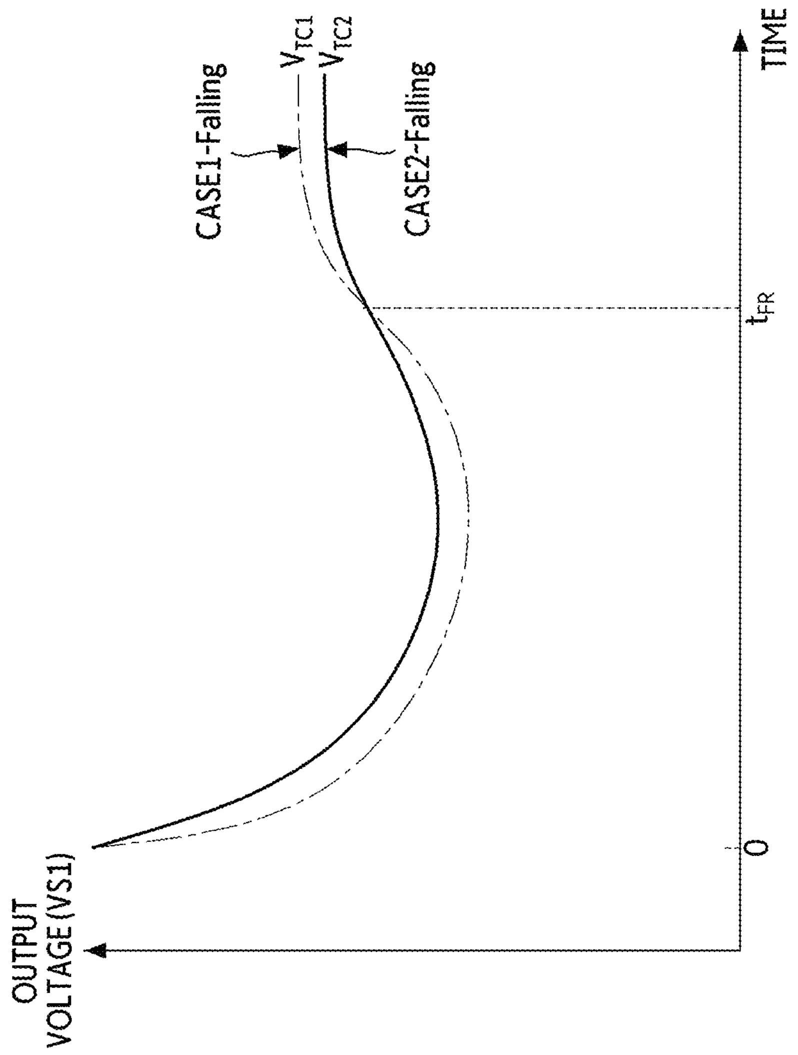
FIG. 7 is a graph showing a slew curve of the output voltage that decreases according to the selected gradation voltage.
Figure 8:
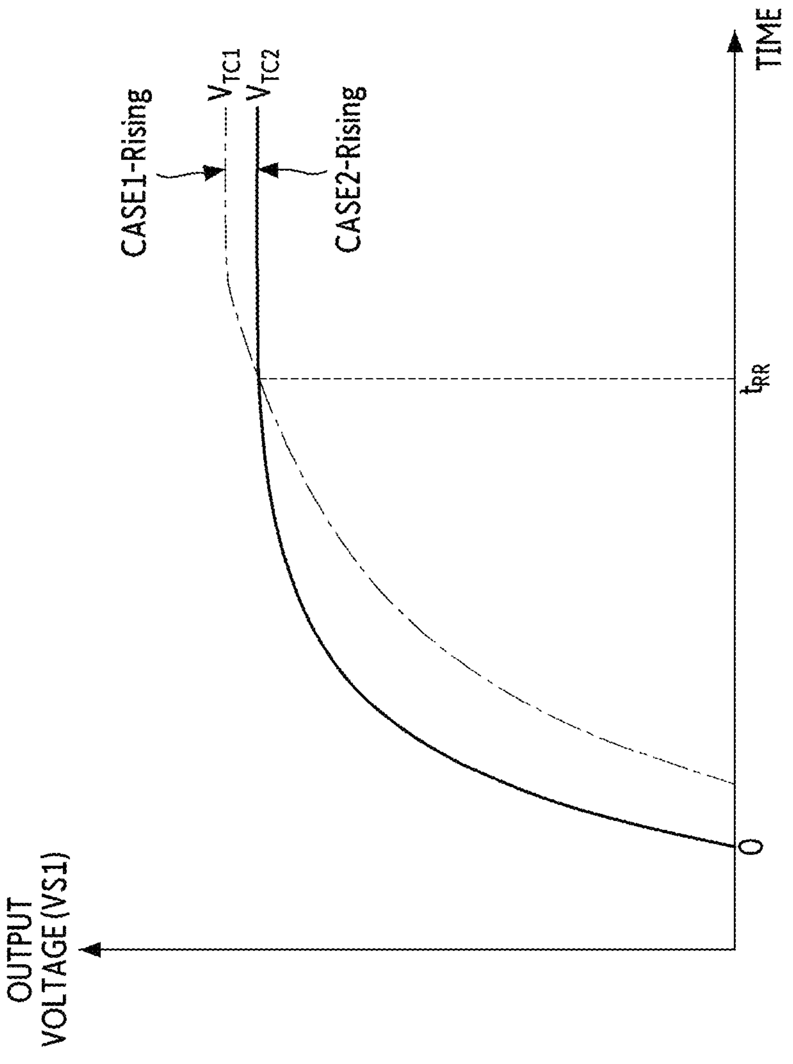
FIG. 8 is a graph showing a slew curve of the output voltage that increases according to the selected gradation voltage.

FIG. 6 is a table showing the slew rate of the output voltage VS1 according to the input of the comparison transistor pair of FIG. 5. FIG. 7 is a graph showing a slew curve of the output voltage that decreases according to the selected gradation voltage. FIG. 8 is a graph showing a slew curve of the output voltage that increases according to the selected gradation voltage. An x-axis of FIGS. 7 and 8 shows the change in time, and a y-axis shows the change in voltage magnitude. In FIGS. 7 and 8, the voltage at time "0" may be the source line voltage VS1 of the previous frame.

Referring to FIGS. 4 to 8, in a first case (CASE1), the decoder circuit 123_1 may select VGk as the first gamma voltage VH and VG(k+1) as the second gamma voltage VL among the plurality of received gamma voltages VG. The first buffer UB1 may receive the selected first and second gamma voltages VH:VGk and VL:VG(k+1), and the interpolation circuit 125_1 of the first buffer UB1 may select the first gamma voltage VH:VGk 0 times and the second gamma voltage VL:VG(k+1) 16 times to select the gradation voltage corresponding to the interpolated data (IPL) "1111". As the second gamma voltage VL:VG(k+1) is selected 16 times, a relatively heavy load may be applied to the gamma line that supplies the second gamma voltage VL:VG(k+1), and a relatively light load may be applied to the gamma line that supplies the first gamma voltage VH:VGk that is never selected. At this time, when the output voltage VS1 is stepped up to the selected gradation voltage $V_{TC1}$ by the slew input switch 129_1 (CASE1-Rising), the second gamma voltage VL:VG(k+1), which is the lower voltage among the two gamma voltages received by the first buffer UB1, may be input to the comparison transistor pair 128_1. Conversely, when the output voltage VS1 is stepped down to the selected gradation voltage VTC1 (CASE1-Falling), the first gamma voltage VH:VGk, which is the higher voltage among the two gamma voltages received by the first buffer UB1, may be input to the comparison transistor pair 128_1.

In the second case (CASE2), the decoder circuit 123_1 may select VG(k+1) as the first gamma voltage VH and select VG(k+2) as the second gamma voltage VL. The first buffer UB1 may receive the selected first and second gamma voltages VH:VG(k+1) and VL:VG(k+2), and the interpolation circuit 125_1 of the first buffer UB1 may select the first gamma voltage VH:VG(k+1) 15 times and select the second gamma voltage VL:VG(k+2) once to select the gradation voltage corresponding to the interpolated data (IPL) "0000". As the first gamma voltage VH:VG(k+1) is selected 15 times, a relatively heavy load may be applied to the gamma line that supplies the first gamma voltage VH:VG(k+1), and a relatively light load may be applied to the gamma line that supplies the second gamma voltage VL:VG(k+2) that is selected only once. At this time, when the output voltage VS1 is stepped up to the selected gradation voltage $V_{TC2}$ by the slew input switch 129_1 (CASE2-Rising), the second gamma voltage VL:VG(k+2), which is the lower voltage among the two gamma voltages received by the first buffer UB1, may be input to the comparison transistor pair 128_1. Conversely, when the output voltage VS1 is stepped down to the selected gradation voltage VTC2 (CASE2-Falling), the first gamma voltage VH:VG(k+1), which is the higher voltage among the two gamma voltages received by the first buffer UB1, may be input to the comparison transistor pair 128_1.

In the first case (CASE1), when the output voltage VS1 is stepped down to the selected gradation voltage $V_{TC1}$ (CASE1-Falling), a gamma line of light load is connected to the comparison transistor pair 128_1, and the slew rate adjusting performance of the fast-slew circuit 126_1 may be relatively high. In the second case (CASE2), when the output voltage VS1 is stepped down to the selected gradation voltage $V_{TC2}$ (CASE2-Falling), a gamma line of heavy load is connected to the comparison transistor pair 128_1, and the slew rate adjusting performance of the fast-slew circuit 126_1 may be relatively degraded. Due to such a difference in slew rate adjusting performance, although the gradation voltage $V_{TC1}$ at the time of the step-down (CASE1-Falling) of the first case (CASE1) is higher than the gradation voltage $V_{TC2}$ at the time of the step-down (CASE2-Falling) of the second case (CASE2), an inversion may occur in which the output voltage VS1 in the second case (CASE2) becomes higher than the output voltage VS1 in the first case (CASE1) during 0 to $t_{FR}$. That is, an inversion of pixel brightness may occur during 0 to $t_{FR}$, which may correspond to an unintended malfunction.

On the other hand, in the first case (CASE1), when the output voltage VS1 is stepped up to the selected gradation voltage $V_{TC1}$ (CASE1-Rising), a gamma line of a heavy load is connected to the comparison transistor pair 128_1, and the slew rate adjusting performance of the fast-slew circuit 126_1 may be relatively degraded. In the second case (CASE2), when the output voltage VS1 is stepped up to the selected gradation voltage $V_{TC2}$ (CASE2-Rising), a gamma line of a light load is connected to the comparison transistor pair 128_1, and the fast-slew circuit 126_1 may have a relatively high slew rate adjusting performance. Due to such a difference in slew rate adjusting performance, although the gradation voltage $V_{TC1}$ at the time of the voltage rise (CASE1-Rising) of the first case (CASE1) is higher than the gradation voltage $V_{TC2}$ at the time of the voltage rise (CASE2-Rising) of the second case (CASE2), an inversion may occur in which the output voltage VS1 in the second case (CASE2) becomes higher than the output voltage VS1 in the first case (CASE1), during 0 to $t_{RR}$ before the settling time is reached. That is, an inversion of pixel brightness may occur during time 0 to $t_{RR}$, which may correspond to an unintended malfunction.

Figure 9:
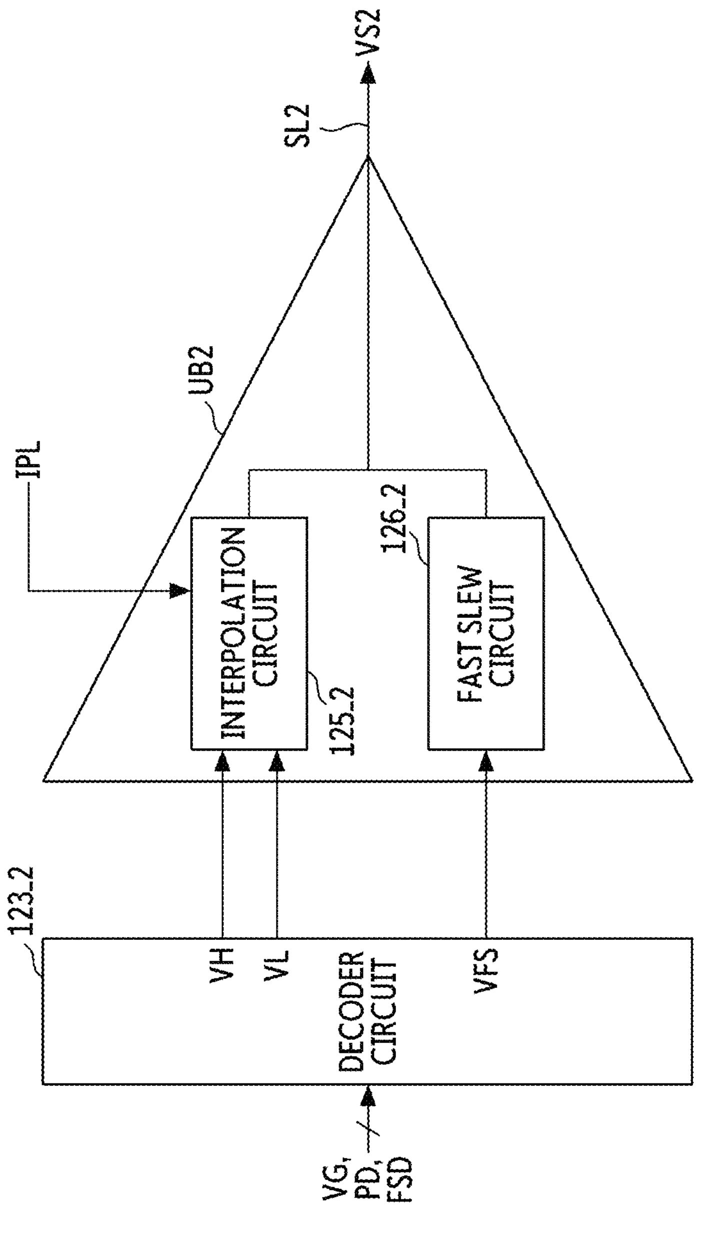
FIG. 9 is a block diagram showing a decoder circuit and one unit buffer of a plurality of unit buffers according to some embodiments of the present inventive concept.

FIG. 9 is a block diagram showing a decoder circuit and one unit buffer of a plurality of unit buffers according to some embodiments of the present inventive concept. FIG. 9 as well as FIGS. 10-16 will be described in the context of the unit buffer UB2; however, an analogous description may be applicable to each of the unit buffers UB1 and UB3 to UBz of FIG. 3.

Referring to FIG. 9, unlike FIG. 4, the decoder circuit 123_2 may further receive slew input data FSD from the timing controller 110. Such slew input data may include a target slew rate, which may be positively correlated with a current frame rate or refresh rate for the display device 10.

The decoder circuit 123_2 may select two gamma voltages VH and VL among the plurality of gamma voltages VG on the basis of the received pixel data PD. At this time, the second gamma voltage VL may have a voltage that is adjacent to the first gamma voltage VH, and is lower than the first gamma voltage VH by the unit voltage.

The decoder circuit 123_2 may further select a third gamma voltage VFS different from the first and second gamma voltages VH and VL on the basis of the received slew input data FSD. Or, unlike FIG. 9, the decoder circuit 123_2 may not receive slew input data FSD and select a third gamma voltage VFS different from the first and second gamma voltages VH and VL. The decoder circuit 123_2 may provide the selected first, second and third gamma voltages VH, VL and VFS to the second buffer UB2. The second buffer UB2 may include an interpolation circuit 125_2 and a fast-slew circuit 126_2. The interpolation circuit 125_2 may receive the first and second gamma voltages VH and VL from the decoder circuit 123_2, and receive 4-bit interpolated data IPL, which is a part of the pixel data PD, from the data latch 122. The interpolation circuit 125_2 may select a gradation voltage corresponding to the received interpolated data IPL by interpolating between the first and second gamma voltages VH and VL. At this time, the third gamma voltage VFS received by the second buffer UB2 may not be used for an interpolation operation when selecting a gradation voltage corresponding to the interpolated data IPL. Rather, as will become apparent below, VFS is used to drive current in a manner sufficient to reduce settling time and to obviate or alleviate the inversion problem described above in relation to FIGS. 4-8.

Figure 10:
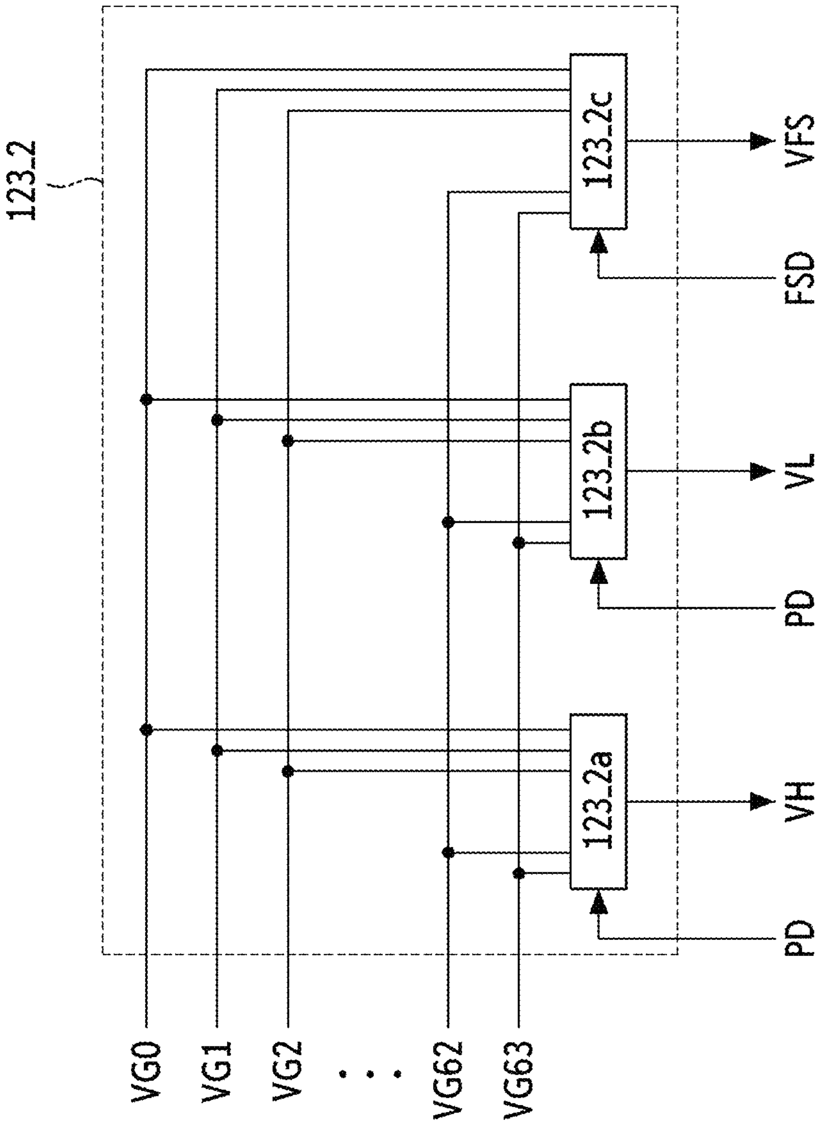
FIG. 10 is a block diagram showing the decoder circuit of FIG. 9.

FIG. 10 is a block diagram showing an example decoder circuit of FIG. 9.

Referring to FIG. 10, the decoder circuit 123_2 may include a first decoder switch **123_2*a* for selecting the first gamma voltage VH, a second decoder switch 123_2*b* for selecting the second gamma voltage VL, and a third decoder switch 123_2*c* for selecting the third gamma voltage VFS. The first decoder switch 123_2*a* may select the first gamma voltage VH on the basis of the pixel data PD received by the decoder circuit 123_2. The second decoder switch 123_2*b* may select the second gamma voltage VL on the basis of the pixel data PD received by the decoder circuit 123_2. The third decoder switch 123_2*c* may select the third gamma voltage VFS, which is different from the first and second gamma voltages VH and VL, on the basis of the slew input data FSD received by the decoder circuit 123_2**.

Figure 11:
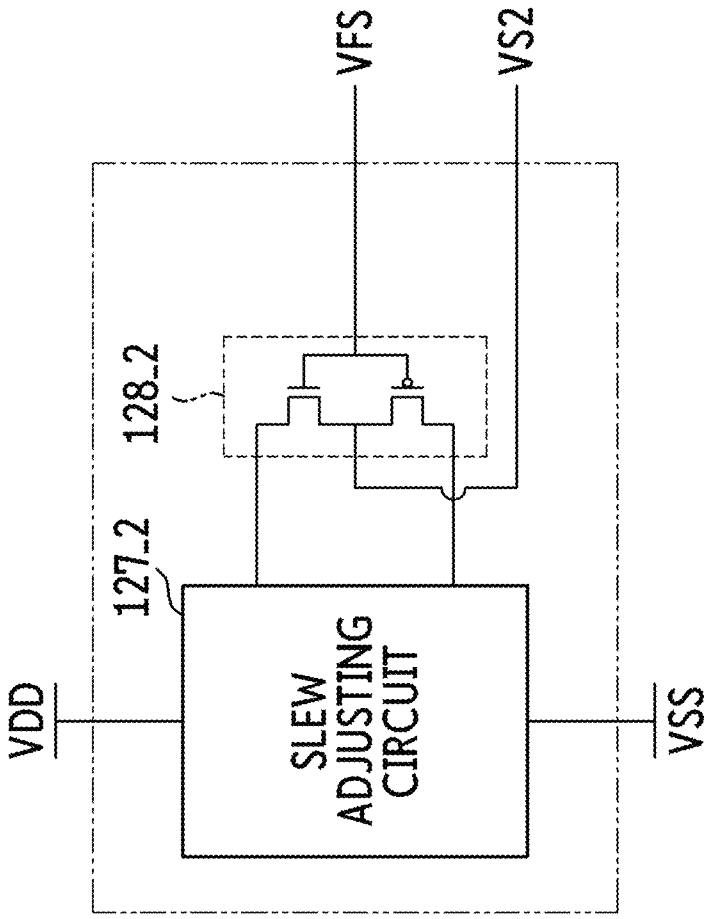
FIG. 11 is a block diagram showing the fast-slew circuit of FIG. 9.

FIG. 11 is a block diagram showing an example of the fast-slew circuit of FIG. 9.

Referring to FIG. 11, the fast-slew circuit 126_2 may include a slew adjusting circuit 127_2 and a comparison transistor pair 128_2.

The comparison transistor pair 128_2 may receive the third gamma voltage VFS as an input voltage to the comparison transistor pair 128_2, and compare it with the output voltage VS2 (of the previous frame) to adjust the output voltage VS2 to a value of a target gradation voltage for a pixel of a current frame. For example, a current may be provided from the slew adjusting circuit 127_2 in a direction that causes the difference between the third gamma voltage VFS and the output voltage VS2 to decrease according to the magnitude difference between the third gamma voltage VFS and the output voltage VS2. When the magnitude difference between the third gamma voltage VFS and the output voltage VS2 becomes smaller than the threshold voltages of the N-channel transistor and the P-channel transistor of the comparison transistor pair 128_2 over time, the comparison transistor pair 128_2 may be turned off, and the current supply of the slew adjusting circuit 127_2 may also be stopped. The current supply of the slew adjusting circuit 127_2 allows the output voltage VS2 of the source line SL2 connected to the second buffer UB2 to be rapidly changed to the gradation voltage selected by the interpolation circuit 125_2.

FIG. 12 is a table showing the slew rate of the output voltage according to the input of the comparison transistor pair. FIG. 13 is a graph showing the slew curve of the output voltage that decreases according to the selected gradation voltage. FIG. 14 is a graph showing the slew curve of the output voltage that increases according to the selected gradation voltage. An x-axis of FIGS. 13 and 14 shows a change in time, and a y-axis shows a change in voltage magnitude. In FIGS. 13 and 14, the voltage at time "0" may be the source line voltage VS2 at the end of the previous frame. The final voltage at time $t_{SC1}$ and time $t_{SC2}$ of FIGS. 13 and 14 may be the target gradation voltage $V_{TC}$ discussed above.

Referring to FIGS. 9 to 14, in the third case (CASE3), unlike the first case (CASE1) of FIG. 6, the decoder circuit 123_2 may select VG(k+2), which is smaller than the second gamma voltage VL:VG(k+1) by the unit voltage, as the third gamma voltage VFS. The third gamma voltage VFS:VG(k+2) is not limited to VG(k+2), and other gamma voltages may be selected. As explained above, a relatively heavy load may be applied to the gamma line that supplies the second gamma voltage VL:VG(k+1) in the third case (CASE3). The third gamma voltage VFS:VG(k+2) received by the second buffer UB2 may be input to the comparison transistor pair 128_2. Since the third gamma voltage VFS:VG(k+2) is not used in the interpolation operation when selecting the gradation voltage corresponding to the interpolated data (IPL) "1111", a relatively light load may be applied to the gamma line that supplies the third gamma voltage (VFS:VG(k+2)), compared to the gamma lines that supply the first and second gamma voltages (VH:VGk, VL:VG(k+1)).

According to some embodiments, since the gamma line of light load supplies an input voltage input to the comparison transistor pair 128_2, when the output voltage VS2 is stepped up to the selected gradation voltage (CASE3-Rising) in the third case (CASE3), the slew rate adjusting performance of the fast-slew circuit 126_2 may be greatly improved compared to the case where the output voltage is stepped up (CASE1-Rising) in the first case (CASE1) explained above. As a result, it is possible to prevent the inversion of the output voltage that occurs between the two specific gradation voltages explained above. In addition, the time required to reach the settling time $T_{SC3}$ when the output voltage VS2 is stepped up to the selected gradation voltage (CASE3-Rising) in the third case (CASE3) may be shorter than the time required to reach the settling time $T_{SC1}$ when the output voltage is stepped up (CASE1-Rising) in the first case (CASE1) explained above. Therefore, it is possible to provide a source driver that has improved reliability, while being capable of high-speed driving through the fast-slew circuit.

Similarly, in the fourth case (CASE4), unlike the second case (CASE2) of FIG. 6, the decoder circuit 123_2 may select VG(k+3) which is smaller than the second gamma voltage VL:VG(k+2) by the unit voltage, as the third gamma voltage VFS. The third gamma voltage VFS is not limited to VG(k+3), and other gamma voltages may be selected. As explained above, a relatively heavy load may be applied to the gamma line that supplies the second gamma voltage VL:VG(k+2) in the fourth case (CASE4). The third gamma voltage VFS:VG(k+3) received by the second buffer UB2 may be input to the comparison transistor pair 128_2. Since the third gamma voltage VFS:VG(k+3) is not used in the interpolation operation when selecting the gradation voltage corresponding to the interpolated data (IPL) "0000", a relatively light load may be applied to the gamma line that supplies the third gamma voltage VFS:VG(k+3), compared to the gamma lines that supply the first and second gamma voltages (VH:VG(k+1), VL:VG(k+2)).

According to some embodiments, because a gamma line of light load supplies input voltage to the comparison transistor pair 128_2, when the output voltage VS2 is stepped down to the selected gradation voltage (CASE4-Falling) in the fourth case (CASE4), the slew rate adjusting performance of the fast-slew circuit 126_2 may be greatly improved, compared to a case where the output voltage is stepped down (CASE2-Falling) in the second case (CASE2). As a result, it is possible to prevent the inversion of the output voltage that occurs between the above-mentioned two specific gradation voltages. Further, the time required to reach the settling time $T_{SC4}$ when the output voltage VS2 is stepped down to the selected gradation voltage (CASE4-Falling) in the fourth case (CASE4) may be shorter than the time required to reach the settling time $T_{SC2}$ when the output voltage is stepped down (CASE2-Falling) in the second case (CASE2) explained above. Therefore, it is possible to provide a source driver that has improve reliability, while being capable of high-speed driving through the fast-slew circuit while.

FIG. 15 is a table showing a slew rate of the output voltage according to the input of the comparison transistor pair in an embodiment that applies different voltages to the fast-slew circuit of FIG. 9 depending on a step-up or step-down situation.

According to some embodiments, the input of the fast-slew circuit 126_2 may be made different by distinguishing the case of stepping up the output voltage and the case of stepping down the output voltage. Referring to FIGS. 9 to 11 and 15, the decoder circuit 123_2 may distinguish the case of stepping up the output voltage VS2 and the case of stepping down the output voltage VS2 on the basis of the slew input data FSD received from the timing controller (110 of FIG. 2), select the third gamma voltage VFS, and provide it to the fast-slew circuit 126_2. For example, in a fifth case (CASE5), when stepping up the output voltage VS2, the decoder circuit 123_2 may select VG(k−1) which is greater than the first gamma voltage VH:VGk by the unit voltage, as the third gamma voltage VFS. The third gamma voltage VFS is not limited to VG(k−1), and a voltage that is greater than VG(k−1) (for example, a gamma voltage greater than the first gamma voltage VGk by y times the unit voltage (y is a natural number greater than 1)) may be selected in an another example.

As explained above, the comparison transistor pair 128_2 compares the third gamma voltage VFS (which is an input voltage) with the output voltage VS2, and the slew adjusting circuit 127_2 may supply a current in a direction that causes the difference between the input voltage VFS and the output voltage VS2 to decrease by the difference between the third gamma voltage VFS and the output voltage VS2. When stepping up the output voltage VS2, as the third gamma voltage VFS is high, the difference between the third gamma voltage VFS and the output voltage VS2 may increase. The larger the difference between the third gamma voltage VFS and the output voltage VS2 becomes, the larger may be the magnitude of the current supplied by the slew adjusting circuit 127_2. As a result, when stepping up the output voltage VS2, the higher the third gamma voltage VFS is, the faster the output voltage VS2 may change to the selected gradation voltage. Similarly, in a sixth case (CASE6), when stepping up the output voltage VS2, the decoder circuit 123_2 may select VGk which is larger than the first gamma voltage VH:VG(k+1) by the unit voltage, as the third gamma voltage VFS.

According to some embodiments, when stepping down the output voltage VS2 in the fifth case (CASE5), the decoder circuit 123_2 may select VG(k+2) which is smaller than the second gamma voltage VL:VG(k+1) by the unit voltage, as the third gamma voltage VFS. The third gamma voltage VFS is not limited to VG(k+2), and a voltage that is greater than VG(k+2) (for example, a gamma voltage that is smaller than the second gamma voltage (VL:VG(k+1)) by w times the unit voltage (w is a natural number greater than 1)) may be selected in an another example.

When the output voltage VS2 is stepped down, the smaller the third gamma voltage VFS is, the greater the difference between the third gamma voltage VFS which is the input voltage and the output voltage VS2 may be. The greater the difference between the third gamma voltage VFS and the output voltage VS2 is, the greater the magnitude of the current supplied by the slew adjusting circuit 127_2 may be. As a result, when the output voltage VS2 is stepped down, the smaller the third gamma voltage VFS is, the faster the output voltage VS2 may be changed to the selected gradation voltage. Similarly, when the output voltage VS2 is stepped down in the sixth case (CASE6), the decoder circuit 123_2 may select VG(k+3) which is smaller than the second gamma voltage VL:VG(k+2) by the unit voltage, as the third gamma voltage VFS.

Figure 16:
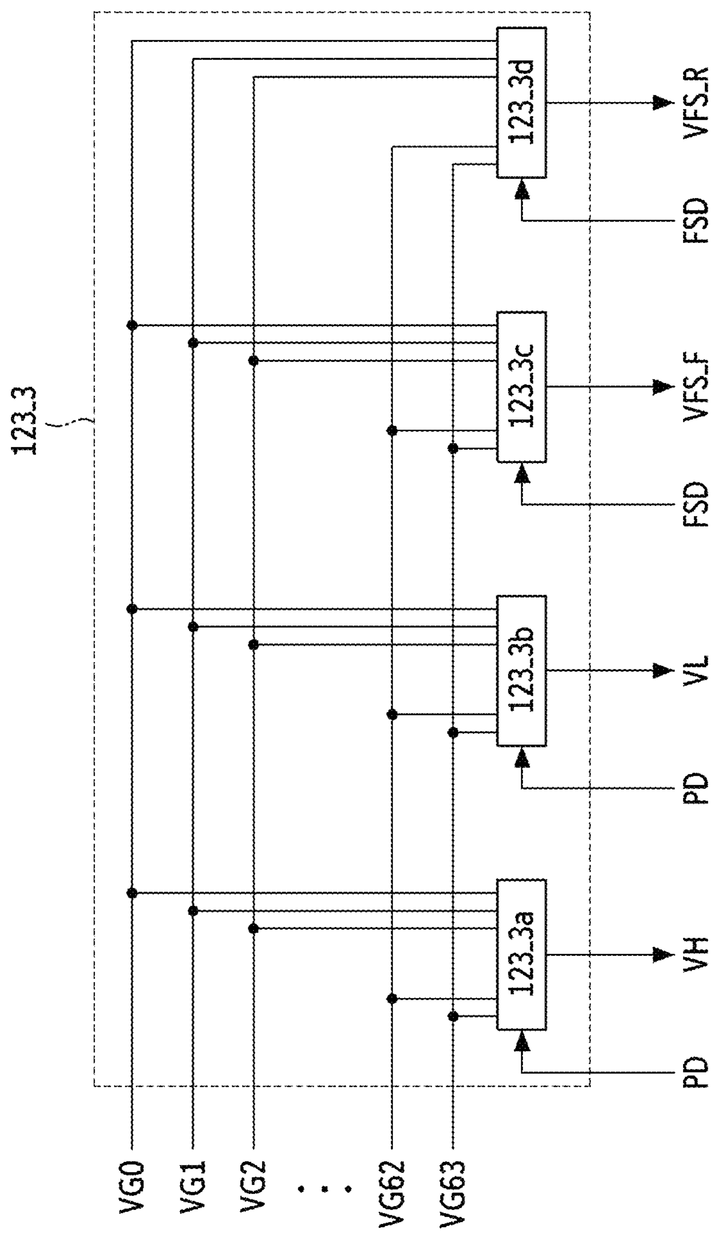
FIG. 16 is a block diagram showing the decoder circuit of FIG. 9.

FIG. 16 is a block diagram showing another example decoder circuit of FIG. 9.

Referring to FIGS. 9 and 16, the decoder circuit 123_3 may further include a fourth decoder switch **123_3*d*, unlike FIG. 10. The third decoder switch 123_3*c* may select a third gamma voltage VFS_F on the basis of the slew input data FSD received from the timing controller (110 of FIG. 2), and the fourth decoder switch 123_3*d* may select a fourth gamma voltage VFS_R on the basis of the slew input data FSD received from the timing controller (110 of FIG. 2). The decoder circuit 123_3 may provide the selected gamma voltages to the fast-slew circuit 126_2. The third gamma voltage VFS_F may be smaller than the second gamma voltage VL, and the fourth gamma voltage VFS_R may be greater than the first gamma voltage VH. The fast-slew circuit 126_2 may further include a slew input switch, e.g., 129_1 of FIG. 5**, may select the fourth gamma voltage VFS_R when stepping up the output voltage, and may select the third gamma voltage VFS_F when stepping down the output voltage.

Figure 17:
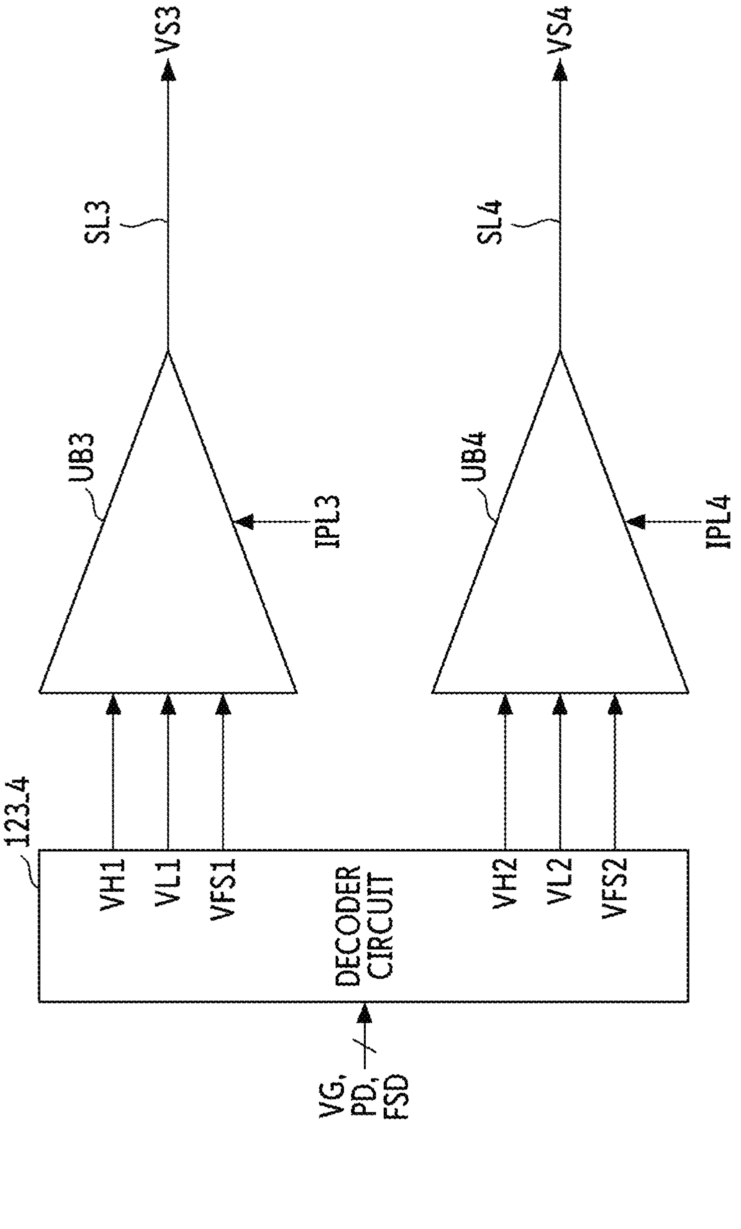
FIG. 17 is a block diagram showing a decoder circuit and two unit buffers among a plurality of unit buffers.

FIG. 17 is a block diagram showing a decoder circuit and two unit buffers among a plurality of unit buffers.

Referring to FIG. 17, a decoder circuit 123_4 may select the first and second gamma voltages VH1 and VL1 to be provided to a third buffer UB3 among the plurality of gamma voltages VG on the basis of the received pixel data PD. The second gamma voltage VL1 may have a voltage which is adjacent to the first gamma voltage VH1 among the sequence of gamma voltages VG, and is lower than the first gamma voltage VH1 by the unit voltage. The decoder circuit 123_4 may select the third gamma voltage VFS1 to be provided to the third buffer UB3 on the basis of the received slew input data FSD. The third buffer UB3 may receive interpolated data IPL3 (LSB data) from the data latch 122 (FIG. 2), and the fourth buffer UB4 may receive interpolated data IPL4 from the data latch 122, in an analogous manner discussed above for the interpolated data IPL of FIG. 3. Also, the decoder circuit 123_4 may select the fourth and fifth gamma voltages VH2 and VL2 to be provided to a fourth buffer UB4 among the plurality of gamma voltages VG on the basis of the received pixel data PD. The fifth gamma voltage VL2 may have a voltage which is adjacent to the fourth gamma voltage VH2, and is lower than the fourth gamma voltage VH2 by the unit voltage. The decoder circuit 123_4 may select a sixth gamma voltage VFS2 to be provided to the fourth buffer UB4 on the basis of the received slew input data FSD.

According to some embodiments, the decoder circuit 123_4 may provide the first, second, and third gamma voltages VH1, VL1, and VFS1 to the third buffer UB3. The third buffer UB3 may select a gradation voltage corresponding to the interpolated data by interpolating between the first and second gamma voltages VH1 and VL1. The decoder circuit 123_4 may also provide the fourth, fifth, and sixth gamma voltages VH2, VL2, and VFS2 to the fourth buffer UB4. The fourth buffer UB4 may select a gradation voltage corresponding to the interpolated data by interpolating between the fourth and fifth gamma voltages VH2 and VL2. The third buffer UB3 may step up or step down the output voltage VS3 of the connected third source line SL3 to the selected gradation voltage. The fourth buffer UB4 may step up or step down the output voltage VS4 of the connected fourth source line SL4 to the selected gradation voltage.

According to some embodiments, the third buffer UB3 may receive the third gamma voltage VFS1 and compare it with the output voltage VS3 to adjust the output voltage VS3. The fourth buffer UB4 may receive the sixth gamma voltage VFS2 and compare it with the output voltage VS4 to adjust the output voltage VS4. For example, when stepping down the output voltage VS3 of the third buffer UB3, the third gamma voltage VFS1 may be different from the first and second gamma voltages VH1 and VL1, and slew rate adjusting performance may be better when the third gamma voltage VFS1 is smaller than the second gamma voltage VL1. Conversely, when stepping up the output voltage VS3 of the third buffer UB3, the third gamma voltage VFS1 may be different from the first and second gamma voltages VH1 and VL1, and slew rate adjusting performance may be better when the third gamma voltage VFS1 is greater than the first gamma voltage VH1. Similarly, when the output voltage VS4 of the fourth buffer UB4 is stepped down, the sixth gamma voltage VFS2 may be different from the fourth and fifth gamma voltages VH2 and VL2, and slew rate adjusting performance may be better when the sixth gamma voltage VFS2 is smaller than the fifth gamma voltage VL2. Conversely, when the output voltage VS4 of the fourth buffer UB4 is stepped up, the sixth gamma voltage VFS2 may be different from the first and second gamma voltages VH2 and VL2, and slew rate adjusting performance may be better when the sixth gamma voltage VFS2 is greater than the fourth gamma voltage VH2.

Figure 18:
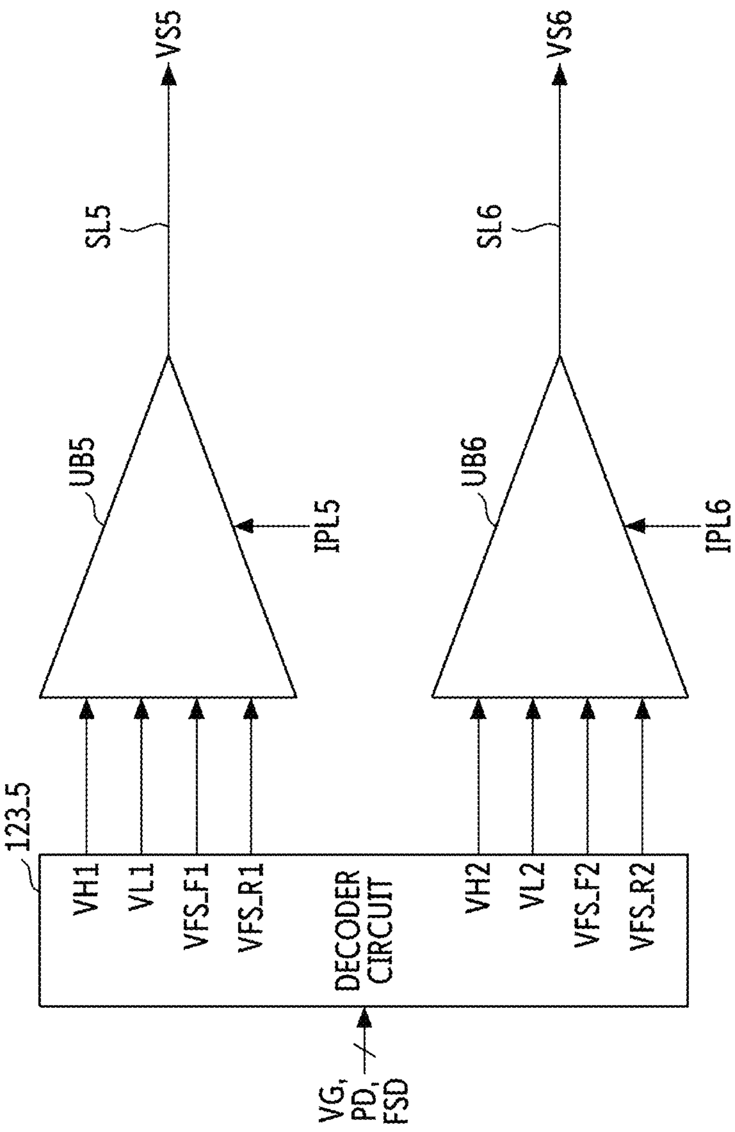
FIG. 18 is a block diagram showing a decoder circuit and two unit buffers among the plurality of unit buffers.

FIG. 18 is a block diagram showing a decoder circuit and two unit buffers among the plurality of unit buffers, according to an embodiment.

Referring to FIG. 18, a decoder circuit 123_5 may select the first and second gamma voltages VH1 and VL1 to be provided to the fifth buffer UB5 among the plurality of gamma voltages VG on the basis of the received pixel data PD. The second gamma voltage VL1 may have a voltage which is adjacent to the first gamma voltage VH1, and is lower than the first gamma voltage VH1 by the unit voltage. The decoder circuit 123_5 may select a third gamma voltage VFS_F1 and a fourth gamma voltage VFS_R1 to be provided to the fifth buffer UB5 on the basis of the received slew input data FSD. At this time, the fourth gamma voltage VFS_R1 may be greater than the first gamma voltage VH1, and the third gamma voltage VFS_F1 may be smaller than the second gamma voltage VL1.

The decoder circuit 123_5 may select fifth and sixth gamma voltage VH2 and VL2 to be provided to a sixth buffer UB6 among the plurality of gamma voltages VG on the basis of the received pixel data PD. A sixth gamma voltage VL2 may have a voltage which is adjacent to the fifth gamma voltage VH2, and is lower than the fifth gamma voltage VH2 by the unit voltage. The decoder circuit 123_5 may select a seventh gamma voltage VFS_F2 and an eighth gamma voltage VFS_R2 to be provided to the sixth buffer UB6 on the basis of the received slew input data FSD. At this time, the eighth gamma voltage VFS_R2 may be greater than the fifth gamma voltage VH2. The seventh gamma voltage VFS_F2 may be smaller than the sixth gamma voltage VL2. The fifth buffer UB5 may receive interpolated data IPL5 (LSB data) from the data latch 122 (FIG. 2), and the sixth buffer UB6 may receive interpolated data IPL6 from the data latch 122, in an analogous manner discussed above for the interpolated data IPL of FIG. 3.

According to some embodiments, the decoder circuit 123_5 may provide the first, second, third, and fourth gamma voltages VH1, VL1, VFS_F1, and VFS_R1 to the fifth buffer UB5. The fifth buffer UB5 may select a gradation voltage corresponding to the interpolated data by interpolating between the first and second gamma voltages VH1 and VL1. The decoder circuit 123_5 may also provide the fifth, sixth, seventh, and eighth gamma voltages VH2, VL2, VFS_F2, and VFS_R2 to the sixth buffer UB6. The sixth buffer UB6 may select a gradation voltage corresponding to the interpolated data by interpolating between the fifth and sixth gamma voltages VH2 and VL2. The fifth buffer UB5 may step up or step down an output voltage VS5 of the connected fifth source line SL5 to a selected gradation voltage. The sixth buffer UB6 may step up or step down the output voltage VS6 of the connected sixth source line SL6 to the selected gradation voltage.

According to some embodiments, when the output voltage VS5 of the fifth buffer UB5 is to be stepped up, the fifth buffer UB5 may compare the fourth gamma voltage VFS_R1 with the output voltage VS5 to adjust the output voltage VS5. When the output voltage VS5 of the fifth buffer UB5 is to be stepped down, the fifth buffer UB5 may compare the third gamma voltage VFS_F1 with the output voltage VS5 to adjust the output voltage VS5. When the output voltage VS6 of the sixth buffer UB6 is to be stepped up, the sixth buffer UB6 may compare the eighth gamma voltage VFS_R2 with the output voltage VS6 to adjust the output voltage VS6. When the output voltage VS6 of the sixth buffer UB6 is to be stepped down, the sixth buffer UB6 may compare the seventh gamma voltage VFS_F2 with the output voltage VS6 to adjust the output voltage VS6.

Figure 19:
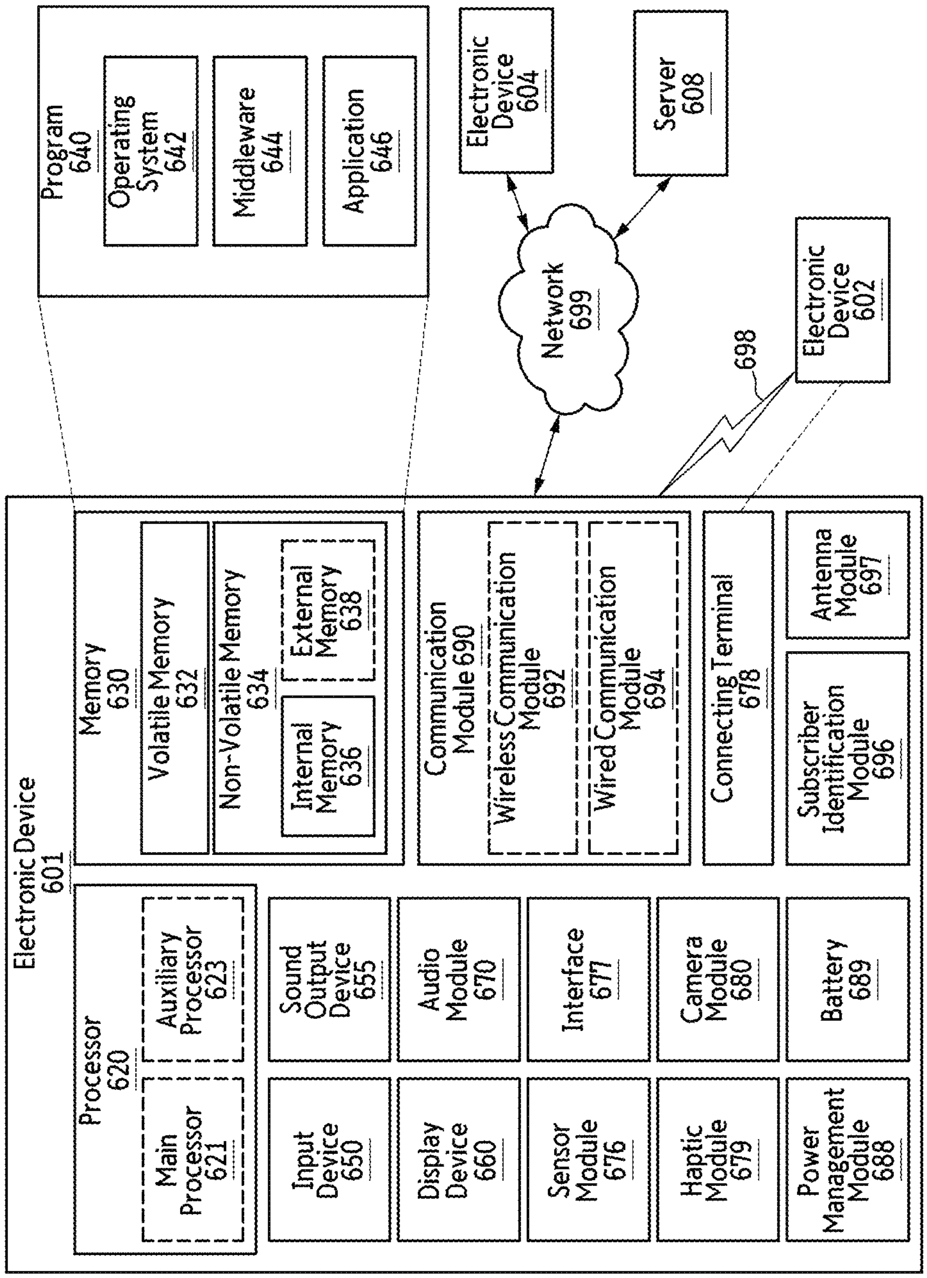
FIG. 19 is a block diagram of an electronic apparatus to which a display driving circuit including the source driver is applied.

FIG. 19 is a block diagram of an electronic apparatus to which a display driving circuit including the source driver is applied.

Referring to FIG. 19, an electronic apparatus 601 in a network environment 600 may communicate with an electronic apparatus 602, for example, through a first network 698 such as a short-range wireless network, or may communicate with an electronic apparatus 604 or a server 608, for example, through a second network 699 such as a long-range wireless network. In some embodiments, although such an electronic apparatus 601 may be, for example, a notebook computer, a laptop computer, a portable mobile terminal, and the like, the embodiments are not limited thereto.

The electronic apparatus 601 may communicate with the electronic apparatus 604 through the server 608. The electronic apparatus 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module (SIM) 696, an antenna module 697, and the like.

In some embodiments, at least one of the components, for example, such as the camera module 680, may be omitted from the electronic apparatus 601, or one or more other components may be added to the electronic apparatus.

In some embodiments, some of the components may be implemented as a single integrated circuit (IC). For example, the sensor module 676, such as a fingerprint sensor, an iris sensor or an illuminance sensor, may be buried in an image display device such as a display.

The processor 620 may execute software (e.g., program 640) for controlling other components of at least one electronic apparatus 601 such as hardware or software component connected to the processor 620, thereby performing various date processing and computations.

According to some embodiments, the display system (1 of FIG. 1) explained above may be implemented as the electronic apparatus 601, and the host (200 of FIG. 1) explained above may be implemented as the processor 620.

As at least some of data processing or computations, the processor 620 may load command or data received from other components such as the sensor module 676 or the communication module 690 to a volatile memory 632, process the command or data stored in the volatile memory 632, and store the resultant data in a non-volatile memory 634.

The processor 620 may include, for example, a main processor 621 such as a central processing unit (CPU) or an application processor (AP), and an auxiliary processor 623 that operates independently of the main processor 621 or in connection with the main processor 621.

Such an auxiliary processor 623 may include, for example, a graphic processing unit (GPU), an image signal processor (ISP), a sensor hub processor, a communication processor (CP) or the like.

In some embodiments, the auxiliary processor 623 may be configured to consume less power than the main processor 621 or perform specific functions. The auxiliary processor 623 may be separated from the main processor 621 or implemented as a part thereof.

The auxiliary processor 623 may control at least some of the functions or statuses associated with at least one component among the components of the electronic apparatus 601, for example, on behalf of the main processor 621 while the main processor 621 is in an inactive status, or together with the main processor 621 while the main processor 621 is in an active status.

The memory 630 may store various types of data used in at least one component of the electronic apparatus 601. Various types of data may include, for example, input data or output data for software such as program 640, and commands associated therewith. The memory 630 may include the volatile memory 632 and the non-volatile memory 634.

The program 640 may be stored as software in the memory 630, and may include, for example, an operating system (OS) 642, a middleware 644 or an application 646.

The input device 650 may receive commands or data to be used in other components of the electronic apparatus 601 from the outside of the electronic apparatus 601. The input device 650 may include, for example, a microphone, a mouse or a keyboard.

The sound output device 655 may output a sound signal to the outside of the electronic apparatus 601. The sound output device 655 may include, for example, a speaker. Multimedia data may be output through the speaker.

The image display device 660 may visually provide information to the outside of the electronic apparatus 601. The image display device may include, for example, a display, a hologram device or a projector, and a control circuit for controlling the corresponding one among the display, the hologram device or the projector.

The image display device 660 may include a touch circuit configured to detect the touch, or a sensor circuit, for example, such as a pressure sensor configured to measure strength of force caused by the touch.

According to some embodiments, the display device (10 of FIG. 1) explained above may be implemented as the image display device 660.

According to some embodiments, the image display device 660 may include a display driving circuit (100 of FIG. 1) and a display panel (300 of FIG. 1). The processor 620 may generate image data to be displayed on the image display device 660, and provide image data and control commands to the image display device 660. For example, the control commands may include setup information on a brightness, a gamma, a frame frequency, an operating mode of the display driving circuit (100 of FIG. 1), etc.

The audio module 670 may convert the sound into an electrical signal or vice versa. In some embodiments, the audio module 670 may obtain the sound through the input device 650 or may output the sound through the sound output device 655 or through a headphone of the external electronic apparatus 602 that is directly or wirelessly connected to the electronic apparatus.

The sensor module 676 detects an operating status of the electronic apparatus 601, such as power or temperature, or an external environmental status of the electronic apparatus 601, such as a user's status, and may generate an electrical signal or data value corresponding to the detected status. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The interface 677 may support one or more specified protocols that are used by the electronic apparatus 601 directly or wirelessly to the external electronic apparatus 602. In some embodiments, the interface 677 may include, for example, a high resolution multimedia interface (HDMI), a universal serial bus (USB) interface, a secure digital (SD) card interface or an audio interface.

A connecting terminal 678 may include a connector through which the electronic apparatus 601 may be physically connected to the external electronic apparatus 602. In some embodiments, the connecting terminal 678 may include, for example, an HDMI connector, a USB connector, an SD card connector or an audio connector (e.g., a headphone connector or the like).

The haptic module 679 may convert an electrical signal into a mechanical stimulus, for example, such as vibration or motion that may be perceived by the user through a tactile sensation or a kinesthetic sensation. In some embodiments, the haptic module 679 may include, for example, a motor, a piezoelectric element or an electrical stimulator.

The camera module 680 may capture still images or moving images. In some embodiments, the camera module 680 may include one or more lenses, an image sensor, an image signal processor, a flash, and the like.

The battery 689 may supply power to at least one component of the electronic apparatus 601. According to an embodiment, the battery 689 may include, for example, a non-rechargeable primary battery, a rechargeable secondary battery or a fuel cell.

The power management module 688 may manage the power to be supplied to the electronic apparatus 601. The power management module 688 may be implemented, for example, as at least a part of a power management integrated circuit (PMIC).

The communication module 690 may support establishment of direct communication channel or wireless communication channel between the electronic apparatus 601 and an external electronic apparatus, for example, such as the electronic apparatus 602, the electronic apparatus 606 or the server 608, and may perform communication through the set communication channel.

The communication module 690 may include one or more communication processors that is operable independently of the processor 620 and supports a direct communication or a wireless communication.

In some embodiments, the communication module 690 may include a wireless communication module 692, for example, such as a cellular communication module, a short-range wireless communication module or a global navigation satellite system (GNSS) communication module, or a wired communication module 694, for example, such as a local area network (LAN) communication module or a power line communication module (PLC).

Among these communication modules, the corresponding communication module may communicate with the external electronic apparatus through the first network 698, for example, such as a Bluetooth™, a WiFi (wireless-fidelity) direct or an IrDA (standard of the Infrared Data Association) or the second network 699, for example, such as a cellular communication network, an Internet or a long-range communication network Various types of communication modules may be implemented as a single component or may be implemented as a plurality of components separated from each other. The wireless communication module 692 may verify and authenticate the electronic apparatus 601 inside a communication network such as the first network 698 or the second network 699, for example, using subscriber information such as an international mobile subscriber identifier (IMSI) stored in the subscriber identification module 696.

The antenna module 697 may transmit or receive signals or power to the outside of the electronic apparatus 601 and from this. In some embodiments, the antenna module 697 may include one or more antennas, and hence, at least one antenna which is suitable for communication scheme used in communication networks such as the first network 698 or the second network 699 may be selected by the communication module 690. The signal or power may then be transmitted or received between the communication module and the external electronic apparatus through at least one selected antenna.

At least some of the aforementioned components may be connected to each other to perform signal communication between them through an inter-peripheral communication scheme, for example, such as a bus, a general purpose input and output (GPIO), a serial peripheral interface (SPI) or a mobile industry processor interface (MIPI).

In some embodiments, command or data may be transmitted or received between the electronic apparatus 601 and the external electronic apparatus 606 through the server 608 connected to the second network 699. Each of the electronic devices 602 and 606 may be apparatuses which are the same type as or different type from of the electronic apparatus 601. All or some of the operations to be executed in the electronic apparatus 601 may be executed in one or more external electronic apparatuses 602, 606 or 608. For example, all or some of the operations to be executed in the electronic apparatus 601 may be performed in one or more external electronic apparatuses 602, 606 or 608.

For example, if the electronic apparatus 601 needs to perform the function or service automatically or in response to request from a user or other devices, the electronic apparatus 601 that executes the function or service may require one or more external electronic apparatuses to perform at least some of the function or service on behalf of this or additionally. One or more external electronic apparatuses that receive the request may perform at least some of the requested functions or services or additional functions or additional services associated with the request, and send the results of the execution to the electronic apparatus 601. The electronic apparatus 601 provides the result as at least part of the response to the request, with or without accompanying further processing of the result. For example, cloud computing, distributed computing or client-server computing techniques may be used for this purpose.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

What is claimed is:

1. A source driver comprising:

a decoder circuit which receives first pixel data and a plurality of gamma voltages, selects a first gamma voltage and a second gamma voltage among the plurality of gamma voltages based on the first pixel data, and selects a third gamma voltage different from the first and second gamma voltages from the plurality of gamma voltages, the second gamma voltage being smaller than the first gamma voltage; and a buffer circuit which receives second pixel data and the first to third gamma voltages, and steps up or steps down a source voltage of a source line to a target voltage on the basis of the first and second pixel data, using the first to third gamma voltages, wherein the buffer circuit includes:

an interpolation circuit that interpolates between the first and second gamma voltages on the basis of the second pixel data to provide the target voltage on the source line; and a fast-slew circuit that compares the source voltage with the third gamma voltage to adjust slew rate of the source voltage.

2. The source driver of claim 1, wherein the fast-slew circuit compares the source voltage with the third gamma voltage to obtain a comparison result, and adjusts a step-up slew rate or a step-down slew rate of the source voltage based on the comparison result.

3. The source driver of claim 2, wherein the third gamma voltage is smaller than the second gamma voltage, and the fast-slew circuit compares the source voltage with the third gamma voltage, and adjusts the step-down slew rate of the source voltage based on comparison result.

4. The source driver of claim 2, wherein the third gamma voltage is greater than the second gamma voltage, and the fast-slew circuit compares the source voltage with the third gamma voltage, and adjusts the step-up slew rate of the source voltage based on comparison result.

5. The source driver of claim 2, wherein the fast-slew circuit compares the source voltage with the third gamma voltage, and adjusts the step-up slew rate or the step-down slew rate of the source voltage to a relatively higher extent when a difference between the source voltage and the third gamma voltage is relatively higher.

6. The source driver of claim 1, wherein:

the third gamma voltage is smaller than the second gamma voltage, the decoder circuit further selects a fourth gamma voltage greater than the first gamma voltage among the plurality of gamma voltages, and the fast-slew circuit further receives the fourth gamma voltage, further compares the source voltage with the fourth gamma voltage, adjusts a step-down slew rate of the source voltage based on a comparison result between the source voltage and the third gamma voltage, and adjusts a step-up slew rate of the source voltage based on a comparison result between the source voltage and the fourth gamma voltage.

7. The source driver of claim 1, wherein the interpolation circuit determines the target voltage without interpolating with respect to the third gamma voltage.

8. The source driver of claim 1, wherein the second pixel data is n-bit data, where n is a natural number, and the interpolation circuit selects the first gamma voltage x times, where x is an integer of $0 \le x \le 2\hat{}n$, selects the second gamma voltage $2\hat{}n-x$ times, and determines the target voltage corresponding to the second pixel data.

9. The source driver of claim 1, wherein the decoder circuit further receives slew input data, and selects the third gamma voltage among the plurality of gamma voltages based on the slew input data.

10. A source driver comprising:

a first buffer which is connected to a first source line, and includes a first interpolation circuit which receives first pixel data, a first gamma voltage, and a second gamma voltage smaller than the first gamma voltage, interpolates between the first and second gamma voltages to select a first target voltage corresponding to the first pixel data, and steps down a first source voltage of the first source line to a first target voltage, and a first fast-slew circuit which receives a third gamma voltage smaller than the second gamma voltage, and compares the first source voltage with the third gamma voltage to adjust slew rate of the first source voltage;

a second buffer which is connected to a second source line, and includes a second interpolation circuit which receives second pixel data, a fourth gamma voltage, and a fifth gamma voltage smaller than the fourth gamma voltage, interpolates between the fourth and fifth gamma voltages to select a second target voltage corresponding to the second pixel data, and steps up a second source voltage of the second source line to a second target voltage, and a second fast-slew circuit which receives a sixth gamma voltage greater than the fourth gamma voltage, and compares the second source voltage with the sixth gamma voltage to adjust slew rate of the second source voltage; and a decoder circuit which receives a plurality of gamma voltages, selects the first through sixth gamma voltages among the plurality of gamma voltages, and provides them to the first and second buffers.

11. The source driver of claim 10, wherein the first interpolation circuit determines the first target voltage without interpolating with respect to the third gamma voltage, and the second interpolation circuit determines the second target voltage without interpolating with respect to the sixth gamma voltage.

12. The source driver of claim 10, wherein the decoder circuit further receives slew input data, and selects the third and sixth gamma voltages among the plurality of gamma voltages based on the slew input data.

13. A display driving circuit comprising:

a source driver which applies a first target voltage to a first source line connected to a first pixel on the basis of pixel data;

a gamma voltage generator which provides a plurality of gamma voltages to the source driver; and a timing controller which controls the source driver and the gamma voltage generator, and provides the pixel data to the source driver, wherein the source driver includes:

a decoder circuit that selects a first gamma voltage and a second gamma voltage among the plurality of gamma voltages based on the pixel data, and selects a third gamma voltage different from the first and second gamma voltages among the plurality of gamma voltages, and a first buffer that interpolates between the first and second gamma voltages to output the first target voltage, steps up or steps down a first source voltage formed on the first source line to the first target voltage, and compares the first source voltage with the third gamma voltage to adjust slew rate of the first source voltage.

14. The display driving circuit of claim 13, wherein the first buffer adjusts a step-up slew rate or a step-down slew rate of the first source voltage based on result of the comparison of the first source voltage with the third gamma voltage.

15. The display driving circuit of claim 14, wherein:

the third gamma voltage is smaller than the second gamma voltage, and the first buffer adjusts the step-down slew rate of the first source voltage based on result of the comparison of the first source voltage with the third gamma voltage.

16. The display driving circuit of claim 14, wherein:

the third gamma voltage is greater than the second gamma voltage, and the first buffer adjusts the step-up slew rate of the first source voltage based on a result of the comparison of the first source voltage with the third gamma voltage.

17. The display driving circuit of claim 14, wherein the first buffer adjusts the step-up slew rate or the step-down slew rate of the first source voltage to a relatively greater extent, as a difference between the first source voltage and the third gamma voltage is relatively higher.

18. The display driving circuit of claim 13, wherein the third gamma voltage is smaller than the second gamma voltage, the decoder circuit further selects a fourth gamma voltage greater than the first gamma voltage among the plurality of gamma voltages, and the first buffer further receives the fourth gamma voltage, further compares the first source voltage with the fourth gamma voltage, adjusts a step-down slew rate of the first source voltage based on a comparison result between the first source voltage and the third gamma voltage, and adjusts a step-up slew rate of the first source voltage based on a comparison result between the first source voltage and the fourth gamma voltage.

19. The display driving circuit of claim 13, wherein the first buffer determines the first target voltage without interpolating with respect to the third gamma voltage.

20. The display driving circuit of claim 13, wherein:

the timing controller further provides slew input data to the source driver, and the decoder circuit further receives the slew input data, and selects the third gamma voltage among the plurality of gamma voltages based on the slew input data.

* * * * *